(12) United States Patent
Yuen

(10) Patent No.: US 6,240,241 B1
(45) Date of Patent: *May 29, 2001

(54) STILL FRAME VIDEO IN INDEX

(75) Inventor: Henry C. Yuen, Redondo Beach, CA (US)

(73) Assignee: Index Systems, Inc., Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/839,458

(22) Filed: Apr. 14, 1997

Related U.S. Application Data

(63) Continuation of application No. 08/480,485, filed on Jun. 7, 1995, now Pat. No. 5,621,579, which is a continuation-in-part of application No. 08/176,852, filed on Dec. 30, 1993, now abandoned, which is a continuation-in-part of application No. 08/066,666, filed on May 27, 1993, now abandoned, which is a continuation-in-part of application No. 08/014,541, filed on Feb. 8, 1993, now abandoned, which is a continuation-in-part of application No. 08/001,125, filed on Jan. 5, 1993, now abandoned, which is a continuation-in-part of application No. 07/883,607, filed on May 7, 1992, now abandoned, which is a continuation-in-part of application No. 07/817,723, filed on Jan. 7, 1992, now abandoned, which is a continuation-in-part of application No. 07/805,844, filed on Dec. 5, 1991, now abandoned, which is a continuation-in-part of application No. 07/747,127, filed on Aug. 19, 1991, now abandoned.

(51) Int. Cl.$^7$ ..................................................... H04N 5/76
(52) U.S. Cl. ............................................. 386/95; 386/121
(58) Field of Search ................................. 386/46, 83, 95, 386/96, 105, 106, 121; 348/906

(56) References Cited

U.S. PATENT DOCUMENTS

| | | | |
|---|---|---|---|
| 4,635,121 | 1/1987 | Hoffman | 358/188 |
| 4,641,205 | 2/1987 | Beyers, Jr. | 360/33.1 |
| 4,703,465 | 10/1987 | Parker | 360/79 |
| 4,706,121 | 11/1987 | Young | 348/27 |
| 4,803,551 | 2/1989 | Park | 348/468 |
| 4,866,434 | 9/1989 | Keenan | 340/825.72 |
| 4,870,515 | 9/1989 | Stokes | 360/72.2 |
| 4,873,584 | 10/1989 | Hashimoto | 358/335 |
| 4,894,789 | 1/1990 | Yee | 348/552 |
| 4,908,707 | 3/1990 | Kinghorn | 348/460 |
| 4,908,713 | 3/1990 | Levine | 358/335 |
| 4,977,455 | 12/1990 | Young | 348/460 |
| 5,010,499 | 4/1991 | Yee | 348/552 |
| 5,038,211 | 8/1991 | Hallenbeck | 348/460 |
| 5,047,867 | 9/1991 | Strubbe | 358/335 |
| 5,063,610 | 11/1991 | Alwadish | 455/45 |
| 5,097,348 * | 3/1992 | Suetaka | 386/95 |
| 5,119,507 | 6/1992 | Mankovitz | 455/154.1 |
| 5,121,476 | 6/1992 | Yee | 395/154 |
| 5,148,403 | 9/1992 | Gardner | 360/15 |
| 5,253,066 | 10/1993 | Vogel | 348/906 X |
| 5,293,357 | 3/1994 | Hallenbeck | 358/335 |
| 5,307,173 | 4/1994 | Yuen | 358/335 |
| 5,390,027 * | 2/1995 | Henmi et al. | 386/83 |
| 5,459,830 * | 10/1995 | Ohba et al. | 345/473 |
| 5,543,929 | 8/1996 | Mankovitz et al. | 358/335 |
| 5,546,191 * | 8/1996 | Hibi et al. | 386/83 |
| 5,786,955 * | 7/1998 | Kori et al. | 386/121 |

* cited by examiner

*Primary Examiner*—Huy Nguyen
(74) *Attorney, Agent, or Firm*—Christie, Parker & Hale, LLP

(57) ABSTRACT

The indexing VCR maintains current information about programs recorded on tape by forming a directory/index of programs comprising a video frame of a program that is being recorded or was previously recorded along with a description or title of the program. Index information is provided on the tape to facilitate direct searching of programs recorded thereon and positioning the tape to selected programs.

14 Claims, 17 Drawing Sheets

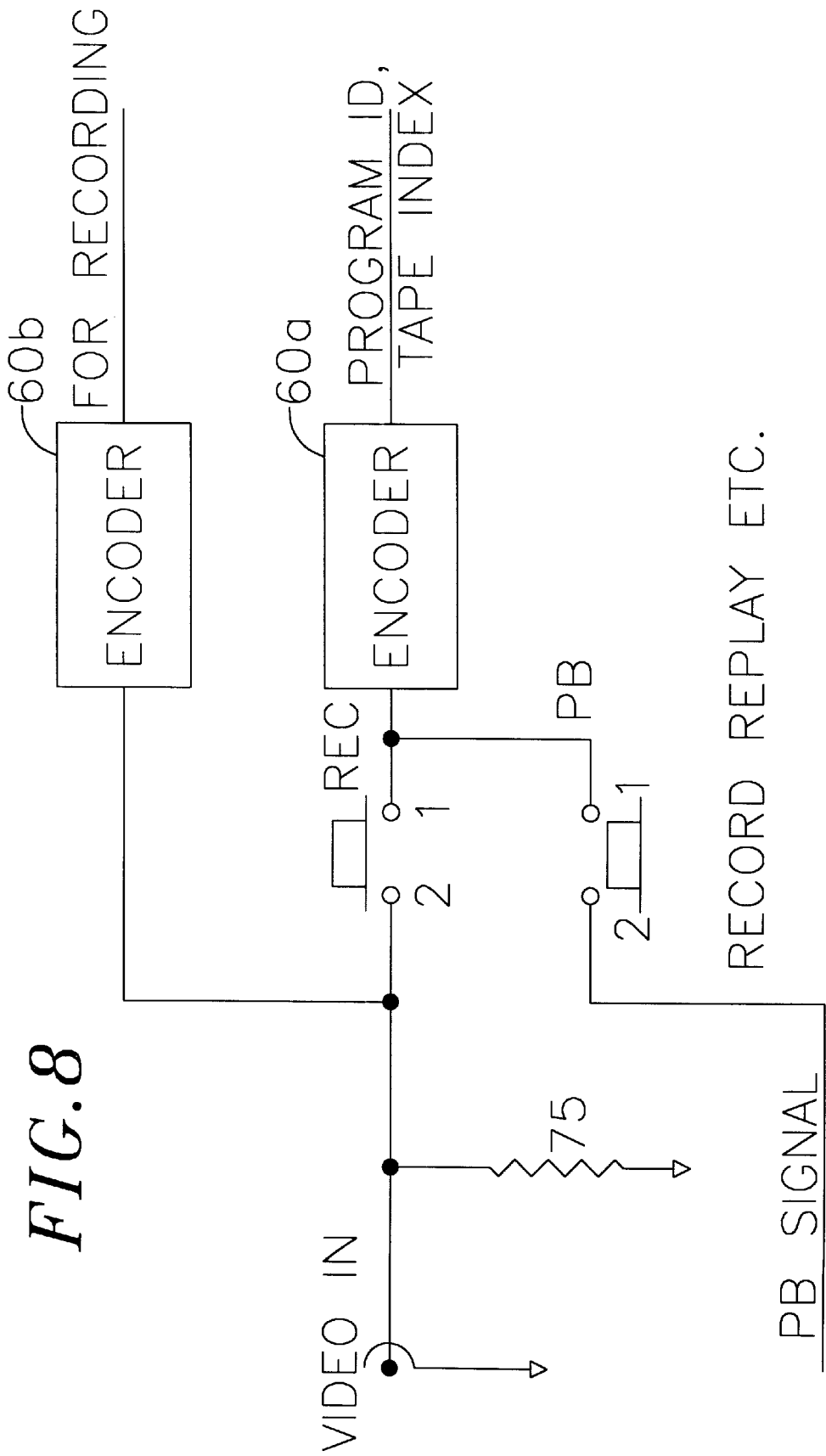

FIG.9

HR TAPES:

CT: | ADD TID ADD TID ADD TID ADD TID ADD TID ADD TID |
START OF PROG.1    START OF PROG.2    START OF PROG.3    END

VBI

SRAM    DIRECTORY

PR TAPES:

CT: | ADD TID ADD TID ADD TID ADD TID ADD TID ADD TID |
START OF PROG.1    START OF PROG.2    START OF PROG.3    END

VBI: | DIR DIR DIR DIR DIR DIR DIR DIR DIR DIR DIR DIR |

SRAM

RI TAPES:

CT: | ADD TID    ADD TID ADD TID    ADD TID |
START OF PROG.1    START OF PROG.2    START OF PROG.3    END

VBI

SRAM    DIRECTORY

FIG. 12

HR TAPE

| 0 | 0 | 0 | 0 | MACHINE ID | TAPE NUMBER |
|---|---|---|---|---|---|

BIT 39 38 37 31 30 15 0

PR TAPE

| 1 | UPC |
|---|---|

39 38 0

↗ 2605

STILL FRAME VIDEO IN INDEX

CROSS REFERENCE TO RELATED APPLICATION

This is a continuation of patent application Ser. No. 08/480,485 filed Jun. 7, 1995, U.S. Pat. No. 5,621,579.

This is a continuation-in-part of application Ser. No. 08/176,852, filed Dec. 30, 1993, abandoned, which is a continuation-in-part of application Ser. No. 08/066,666, filed May 27, 1993, abandoned, which is a continuation-in-part of application Ser. No. 08/014,541, filed Feb. 8, 1993, now abandoned, which is a continuation-in-part of application Ser. No. 08/001,125, filed Jan. 5, 1993, now abandoned, which is a continuation-in-part of application Ser. No. 07/883,607, filed May 7, 1992, now abandoned, which is a continuation-in-part of application Ser. No. 07/817,723, filed Jan. 7, 1992, now abandoned, which is a continuation-in-part of application Ser. No. 07/805,844, filed Dec. 5, 1991, now abandoned, which is a continuation-in-part of application Ser. No. 07/747,127, filed Aug. 19, 1991, now abandoned, the subject matter of each of these applications is incorporated herein by this reference.

FIELD OF THE INVENTION

In one aspect, this invention is related to means and method for facilitating management, storage, and retrieval of video programs on magnetic tape. In another aspect, this invention is related to maintaining current information about programs recorded on a magnetic tape and more particularly to maintaining current information about such a tape using a magnetic tape reader/recorder, and magnetic tape cassettes therefor.

BACKGROUND OF THE INVENTION

As fully explained in application Ser. No. 08/176,852, directories in text are provided for home recorded (HR) tapes and for pre-recorded (PR) tapes to facilitate selection and playing of programs recorded on a tape. An indexing VCR is provided to retrieve the directory from either on the tape (particularly for PR tapes) or from the RAM in the VCR (particularly for HR tapes).

SUMMARY OF THE INVENTION

A frame of the video program that is recorded on tape is selected to be displayed with the directory in text form for one or more of the recorded programs. This improves the appearance and usefulness of the directory by adding a picture to the textual matter.

The still video frame for the program is captured and stored in RAM during the recording of the program on HR tape. The VCR is alerted to the location or timing of the selected frame to be stored by a flag, such as a control packet in the VBI, during reception of the program. The packet may be included in the data of the EDS field and line or carried by any other line that may be identified by a pointer in one of the normally used lines, such as the EDS line, for example.

For PR tapes, the still video frame picture for each program having a still video frame picture is stored at the beginning of the tape. Where the PR tape is purchased and becomes part of the library or rented or borrowed and used on plural occasions, the directory with still frame video is stored in the RAM of the VCR to obviate the need to return to the beginning of the tape where the still video frame would typically be recorded.

The invention provides, in a magnetic tape cassette reader/recorder, a method and apparatus for maintaining a directory of recorded programs including a still video frame picture. The availability of the program directory can greatly facilitate operation of the tape cassette reader/recorder.

Different embodiments of the present invention are disclosed in the specification for storing the directory and still video frame picture. According to one embodiment of the present invention, directory information and still video frame pictures are recorded on the tape itself.

In one implementation of this embodiment, directory information is written on the video track of the tape in the vertical blanking intervals (VBI) of recorded video signals and the still video frame picture are stored at the beginning of the tape. Alternatively, the still video frame pictures are stored in RAM in the VCR.

In still another embodiment of the present invention, directory information of a tape is stored in a random access memory located in the VCR with the associated still video frames for the programs recorded on the tape also being stored in a portion of the same RAM or in a different random access memory. An identification (e.g. a volume label) is written on the tape whereby the corresponding directory information can be retrieved from the random access memory when the tape is loaded into the VCR. Further, the still video frame picture for a selected recorded program is retrieved from memory and displayed on the screen.

Index information are provided on the tape to facilitate searching of programs recorded thereon and positioning the tape to selected programs.

In another embodiment, a library containing the directories with still video frame picture of a plurality of selected tapes is stored in the VCR. The availability of the library facilitate searching of programs among the plurality of tapes.

In a preferred embodiment, a hybrid VCR system is capable of detecting the address and the tape identification number (TID) from either the control track or the VBI of a video tape and identifying the type of tape therefrom. A first type of tape is a home recorded tape (HR tape) in which the directory thereof is stored in a RAM and the TID and the address are stored in the control track in a first embodiment and in the VBI in a second embodiment. A second type of tape is a prerecorded tape (PR tape) from a publisher in which the directory is stored in the VBI and the addresses are stored in a similar manner to the HR tapes and the still video frame pictures are stored at the beginning of the tape.

BRIEF DESCRIPTION OF THE DRAWINGS

FIG. 8 illustrates a VBI decoder for decoding both broadcast signals and recorded signals.

FIG. 9 is a schematic view of an embodiment for storing tape identification numbers and addresses using a file mark plus asynchronous sprinkling address system.

FIG. 12 is a schematic diagram showing the format for another embodiment of a TID for an HR tape.

FIG. 13 is a schematic diagram showing the format for another embodiment of a TID for a PR tape.

DETAILED DESCRIPTION

Figure 1:
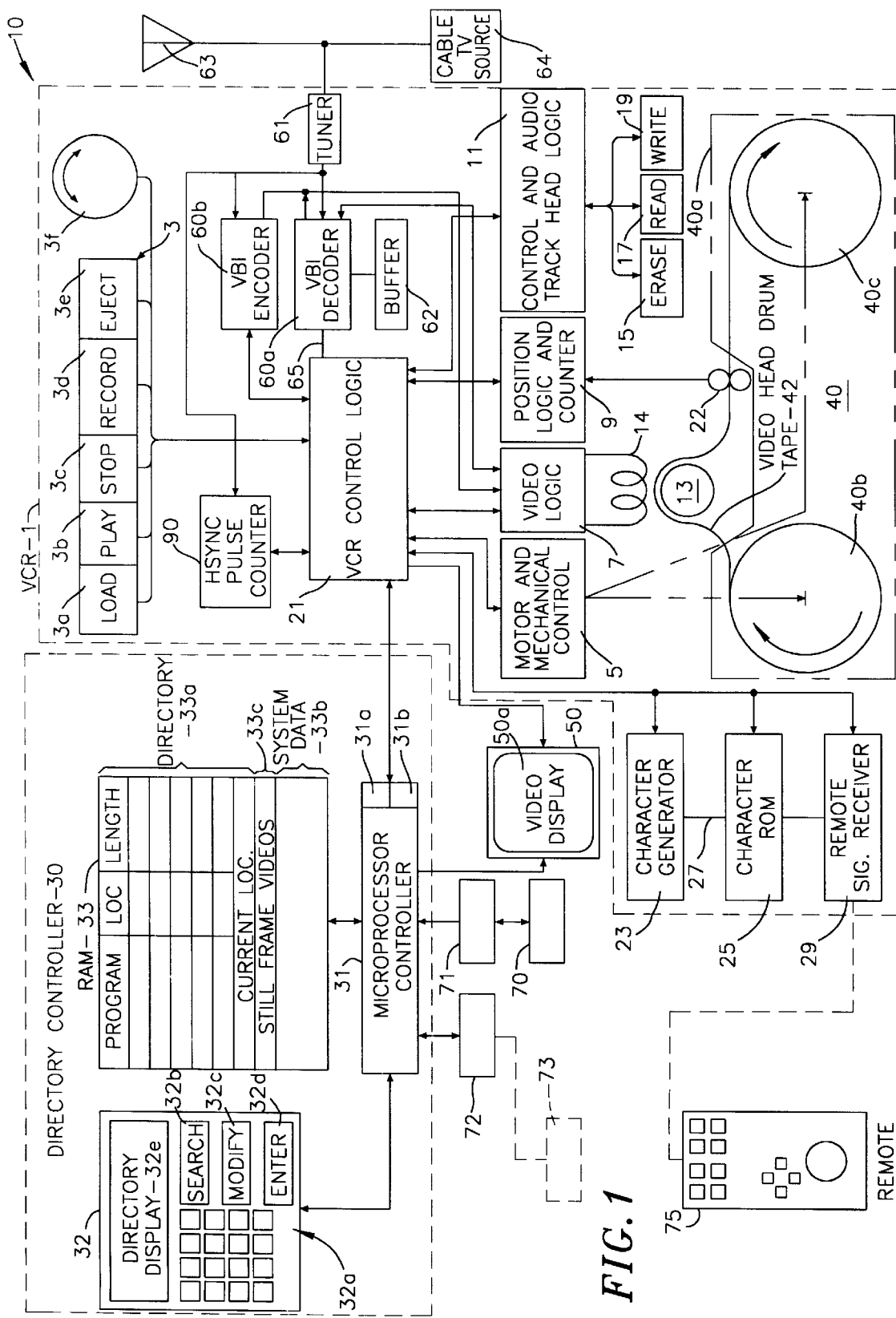
FIG. 1 is a block diagram illustrating a indexing video cassette recorder, using a hybrid indexing system that provides indexing of recorded programs for home recorded tapes, prerecorded tapes, and retroactively indexed tapes, and a standard video cassette format, and that has a directory controller, a bus interface, and an output interface and embodies the invention.

An indexing VCR having the ability to recover and store selected video frames as still pictures to enhance a textual directory either in RAM associated with the VCR or on the magnetic tape is illustrated by block diagram in FIG. 1.

By way of background, as described in application Ser. No. 08/176,852, the VBI decoder 60*a* in the indexing VCR scans VBI lines 10–25 of both fields 1 and 2. Lines 1 through 9 are typically used for vertical synchronization and equalization and, thus, are not used to transmit data. Closed captioning and text mode data are generally transmitted on VBI line 21, field 1 of the standard NTSC video signal, at a rate of 480 bits per second. Extended data services (EDS) data is transmitted on VBI line 21, field 2.

The data in the vertical blanking interval can be described in terms of the waveform, its coding and the data packet. The closed caption data waveform has a running clock followed by a frame code, followed by the data. The coding of the data is non-return-to-zero (NRZ) 7 bit odd parity.

Under the extended data services (EDS) proposed in the *Recommended Practice for Line* 21 *Data Service*, Electronics Industries Association, EIA-608 (drafts Oct. 12, 1992 and Jun. 17, 1993) (hereinafter referred to as "EIA-608" standard", the subject matter of which is incorporated by reference, additional data is provided in line 21, field 2 of the vertical blanking interval. This requirement includes two closed captioning fields, two text mode fields and the extended data services. Table I of application Ser. No. 08/176,852 shows the classification of data, the class control code, and the type code. The extended data includes, among other information, program name, program length, length into show, channel number, network affiliation, station call letters, UCT (universal coordinated time) time, time zone, and daylight savings time. Upstream at the network, the network inserts the program name, the length of the show, the length into the show, the network affiliation, and the UCT time. Downstream at the affiliate, the affiliate inserts the channel number, the time zone, the daylight standard time and program names. The network inserts the data that does not differ for different affiliates.

The data is transmitted in packets. Six classes of packets are proposed in the EIA-608 standard, including: (1) a "Current" class for describing a program currently being transmitted; (2) a "Future" class for describing a program to be transmitted later; (3) a "Channel Information" class for describing non-program specific information about the transmitting channel; (4) a "Miscellaneous" class for describing other information; (5) a "Public Service" class for transmitting data or messages of a public service nature such as National Weather Service Warnings and messages; and (6) a "Reserved" class reserved for future definition.

For home recording of broadcast (over the air, including satellite, by cable, or by fiber optics) programs, a packet is included in the EDS to inform the VCR that a frame of video from the broadcast program should be recorded as part of the directory for programs recorded on tape. The packet includes data identifying it as a flag for recovery of the selected frame of video for storage as a still video frame picture for use as part of the directory. The packet may be located in a different line of the VBI with a pointer being in the EDS data or without a pointer where the decoder looks at each line of the VBI. The flag alerts the VCR that the selected frame will start a certain number of horizontal sync pulses later. Other ways of identifying the selected frame to be used as the still video frame picture may be employed.

Overview of the Tape Indexing System

It is a feature of this invention that an indexing VCR uses a directory as described below to assist in selecting a program by use of still video frame pictures, perform searches, by title, category, key words, or the like, of the user's video tape library to find the particular tape that a selected program is on. In addition, a directory of the particular tape may be similarly searched to locate a program on the tape. The tape may then be automatically advanced to the selected program. Indexing is used herein to describe the searches, the generation of these directories, and the like.

The directory contains information related to the identification number of a tape, the programs recorded thereon and related information to these programs, such as length of time, type of program, and address (also referred to as location) on the tape. The directory may be recorded in different locations on the tape for different embodiments as described in the parent patent application. In one embodiment described herein, the tape directory is recorded in a random access memory (RAM) for home recorded tapes and recorded on the tape itself in the vertical blanking interval for prerecorded tapes.

The Indexing VCR

FIG. 1 is a block diagram of an indexing VCR system 10 including a video cassette reader/recorder (VCR) 1 with a conventional video tape cassette 40, a video display 50, and a directory controller 30. The VCR 1 is a video reader/recorder device and uses any one of many different recording technologies such as BETA, VHS, super VHS, 8 mm, VHS-C or any other popular technologies. In particular, VHS-C indexed tapes can be played directly on a VHS indexing VCR with full index functioning. The cassette 40 is a conventional video cassette having a magnetic tape 42 packaged in a cartridge 40a or cassette housing (hereafter called cassette) and transported between a feeding spindle 40b and a takeup spindle 40c. Even though the size and design of the housing is different for different types of recording technology, the basic information that goes on the tape itself is similar. The technology and operation of a VCR are well understood in the art.

The VCR 1 has a button control panel 3 with control buttons, including LOAD 3a, PLAY 3b, STOP 3c, RECORD 3d, and EJECT 3e, for controlling the operation of the VCR 1. The LOAD button 3a is optional and is not used on machines which load automatically. The VCR control logic circuit 21 receives control signals from the button control panel 3 and controls the overall operation of the VCR 1 by sending control signals to a motor and mechanical control logic circuit 5, a video logic circuit 7, a position logic and counter circuit 9, and a control and audio track head logic circuit 11 of the VCR 1, as well as to the video display 50 and the microprocessor controller 31 of the directory controller 30.

The motor and mechanical control logic circuit 5 controls loading and ejecting of the cassette 40 and also controls movement of the video tape 42 within the video cassette 40 during recording, reading (playback), fast forward, and rewind. The video logic circuit 7 controls the operation of a video read/write head drum 13 in reading from or recording video signals to the tape 42. The electrical signals are magnetically coupled between the video logic circuit 7 and the video head drum 13 using a winding 14. The position logic and counter circuit 9 monitors tape movement through a cassette tape movement sensor 22 and generates signals that represent tape position. The control and audio track head logic circuit 11 controls writing, reading, and erasing of signals on the control or audio track of the tape 42 through the write head 19, the read head 17, and the erase head 15.

The directory controller 30 includes a microprocessor controller 31, a random access memory (RAM) 33 and a directory input/output display and control panel 32. Preferably the microprocessor controller 31 comprises an integrated circuit microprocessor, a program store 31a, such as a read-only-memory (ROM), for storing a control program to implement methods of the invention, and a clock 31b for generating a clock signal for timing functions and providing the time. The time may be set using the directory input/output display and control panel 32 in a manner known in the art. (Alternatively, the VCR 1 may maintain the time.) The microprocessor controller 31 controls the sequence and operation of the directory controller 30 and interfaces with the VCR control logic circuit 21 to implement the necessary functional capabilities for reading, updating and recording the directory. The microcontroller processor 31 in the indexing VCR 10 performs all indexing functions and human interface, interprets (e.g. tab, indent, screen format, attributes) and processes the auxiliary information display.

The RAM 33 is a conventional random access semiconductor memory which interfaces directly with the microprocessor controller 31. The RAM 33 is preferably non-volatile. Alternatively, the RAM 33 is battery backed up. The battery back up should maintain the contents of the memory for a predetermined time, e.g., 7 days, after the loss of power. The retention time may be shorter, if the indexing VCR uses an automatic backup of the memory onto video tape, such as described below. A portion of the RAM 33 shown as system data 33b, is also used for storing the system software of the microprocessor controller 31. Another portion of the RAM 33c is used for storing still video frame pictures. This portion as well as each of the others may be a separate memory. Still another portion of the RAM 33 is used as a temporary memory for storing part of the directory read from a prerecorded tape. The size of the RAM 33 is at the discretion of the manufacturer. However, the RAM 33 preferably can store the directory of at least 400 tapes.

A display 32e is a conventional liquid crystal or other type display for displaying the directory or other information stored in the RAM 33. Alternately, as discussed below, an on-screen display 50a can be used. The directory information stored in the RAM 33 is processed by the microprocessor controller 31.

The VCR 1 additionally comprises a character generator circuit 23 coupled to the VCR control logic circuit 21 and to a character generator read-only memory (ROM) 25. Character generators are well-known in the art. Typically, the character generator ROM 25 stores a data table representing pixel or bit patterns of a plurality of alphanumeric characters, such as the Roman alphabet and the Arabic numerals. Upon command by the VCR control logic circuit 21 and the character generator circuit 23, the data in the character generator ROM 25 is read and placed in an output signal to the video display at a position on the display determined by coordinates generated by the microprocessor controller 31. The end result is visual display of a alphanumeric character on the display screen. Character generators are well-known for channel display in television receivers, and for use in professional titling equipment.

The still video frame is also read and displayed on display 50 for a selected program.

As shown in FIG. 1, an input of a VBI signal decoder 60a is coupled to the output of a tuner 61, which is generally included in the majority of consumer VCR's for off-the-air recording. The tuner 61 receives a broadcast TV signal from an antenna 63, a cable TV signal source 64, or a satellite receiver system. The tuner 61 down converts the received broadcast video signal from one of several different video channels onto a common unused television channel, typically channel 3 or 4. The tuner 61 provides the down converted video signals to a VBI decoder 60a which decodes data recorded on the VBI of the received video signal, a VBI encoder 60b which encodes data onto the VBI of the video signal that is to be recorded onto the video tape 42, and the video logic circuit 14. The VBI decoder 60a can decode at least lines 10–25 of both fields of the VBI. The decoder 60a may also decode VBI signals using copy protection pulses inserted therebetween, such as the Macrovision copy protection system.

Data encoded in the VBI is retrieved by the VBI decoder 60a and provided to the directory controller for automatic generation of the program title for the directory of the program being recorded. Additionally, the decoder 60a retrieves the flag packet and provides the flag to the VCR control logic 21 for capturing and storing the selected video frame as a picture to be used as port of the description of a video program that is recorded.

A decoder signal line 65 is coupled from the decoder to the VCR control logic circuit 21 to carry decoded VBI data to the control logic circuit. The VCR control logic circuit 21 is commanded by the microprocessor controller 31 to pass the decoded data to the directory 33a and to capture and store the selected video frame under control of a stored program in the RAM 33. The program then causes the VBI information to be stored as a program title in the directory and displayed on the display 50 along with the still video frame picture of the selected stored program.

Memory Structure

Figure 2:
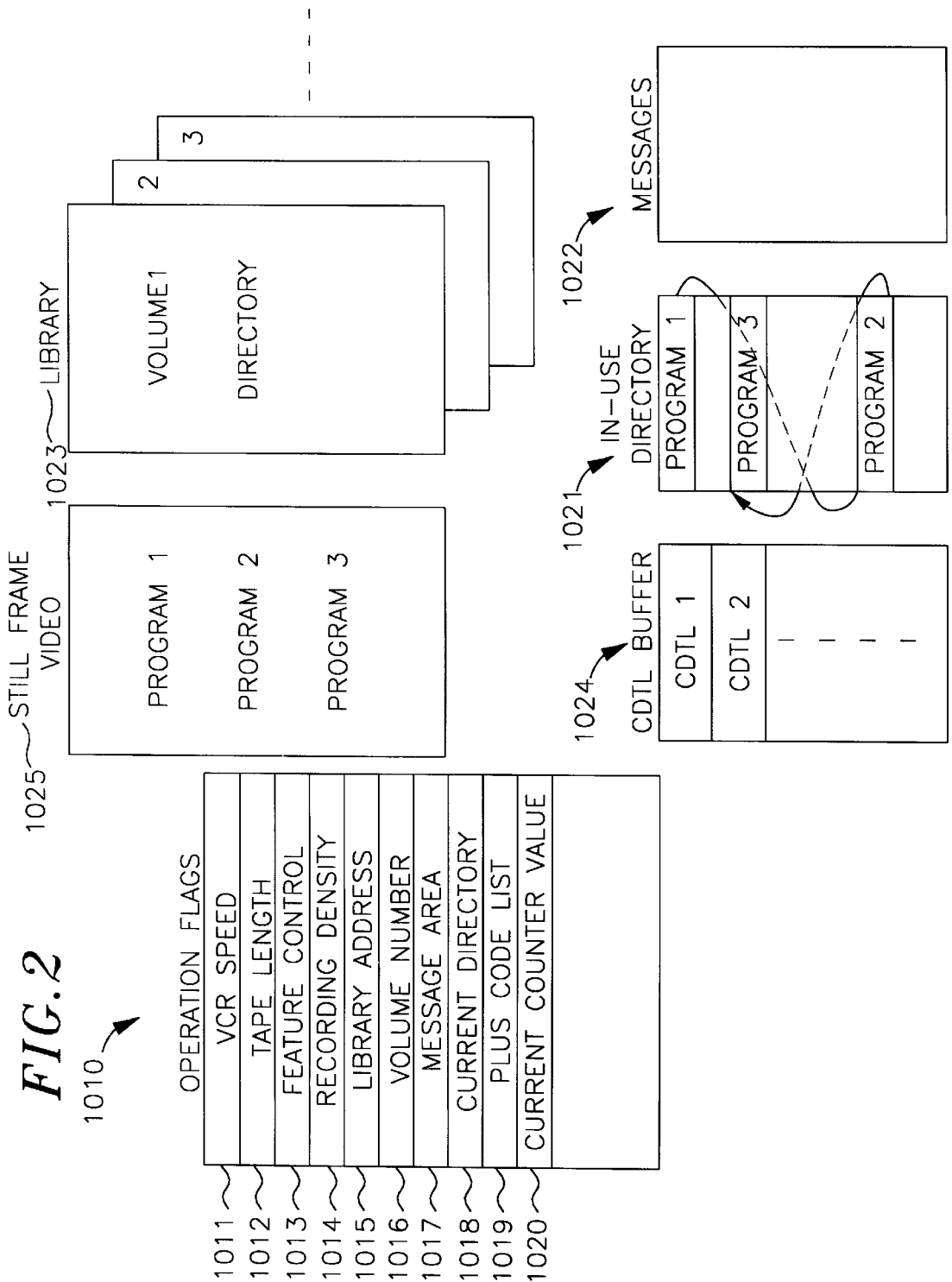
FIG. 2 is a schematic conceptually illustrating a structure of data stored in the RAM of the directory controller of FIG. 1 according to a specific implementation of the present invention.
Figure 3:
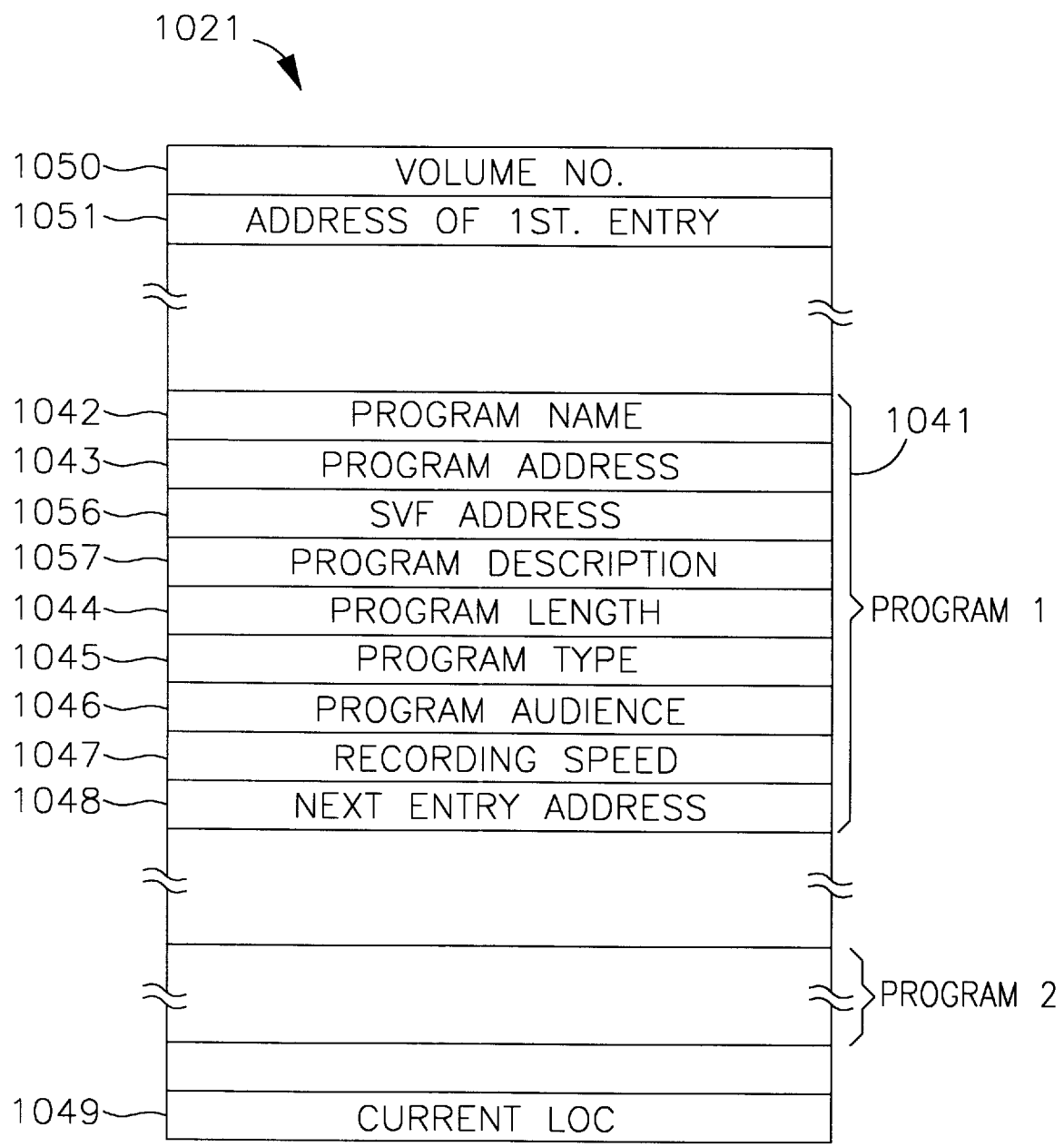
FIG. 3 is a schematic illustrating a conceptual structure of an in-use directory in the data structure of FIG. 2 according to a specific implementation of the present invention.

Now the memory structure of the RAM 33 is described by referring to FIGS. 2 and 3 which is a schematic conceptually illustrating a typical structure of the data stored in the RAM 33 according to one embodiment of the present invention.

In a preferred embodiment, a library 1023 is also provided in the RAM 33. The library 1023 stores directories of tapes which users of the VCR 1 have archived. Each directory stored in the library contains substantially the same information as the in-use directory. If a library is present, a library pointer 1015 is provided for pointing to the library 1023.

A directory pointer 1018 is also provided for pointing to an in-use directory 1021 which stores the directory of the currently inserted tape. This directory pointer 1018 may actually point to a location in the library wherein the directory of the tape is located.

In addition, the area 1010 also stores a tape or volume number field (VOLNO) 1016 which stores a counter value representing the number of tape directories already stored in the library 1023. Other flags may be added as needed.

Referring to FIG. 3, which is a schematic illustrating a conceptual structure of the in-use directory 1021 in the data structure of FIG. 2, the in-use directory 1021 stores the directory of the cassette tape currently inserted into the VCR 1. For each program recorded on the cassette tape, a corresponding entry 1041 is set up in the in-use directory 1021. For purposes of illustration, FIG. 3 shows the entry 1041 only for program 1. However, each program similarly has an entry 1041. Each entry 1041 stores a title or program name (PROGRAM) 1042; a program address (LOC) 1043 which stores the absolute tape counter value of the beginning of the program; a still video frame (SVF) address 1056; a description of the program or an address for this description 1057; a program length value (LENGTH) 1044 which stores the length of the recorded program, represented as a function of the difference between its address from the address of the next program or record or a measure of time from a fixed reference point, such as the beginning of the tape; an optional program type field (TYPE) 1045 which stores the category of the recorded program; an optional program audience field (AUDIENCE) 1046 which stores the recommended audience of the program; and an optional recording speed (SPEED) 1047 which stores the speed at which the program is recorded.

A current tape location (CURRENT LOC) 1049 is also stored in the directory for indicating the absolute position from the beginning of the tape 42 in the cassette 40 where the valid directory is located, or the value of the tape counter when the tape is ejected. This field is used for setting the tape counter when the tape is reloaded into the VCR 1.

A field 1051 is a pointer pointing to the address of the first entry of the directory 1021 represented in FIG. 3 by an arrow pointing to the program name (PROGRAM) 1042. Each entry also has a field 1048 storing the address of the next entry in the directory also represented in FIG. 3 by an arrow pointing to program 2. These fields provide a link from one entry to the next entry and are used for facilitating search, deletion, and addition of entries. In the preferred embodiment, the directory information is not stored on the tape 42, but is retrieved from the library 1023. In this embodiment, a volume label (VOLNO) 1050 is provided in the in-use directory 1021. This field is used for retrieving the directory information of the tape from a library 1023 stored in the RAM 33.

Tape Format

Figure 4:
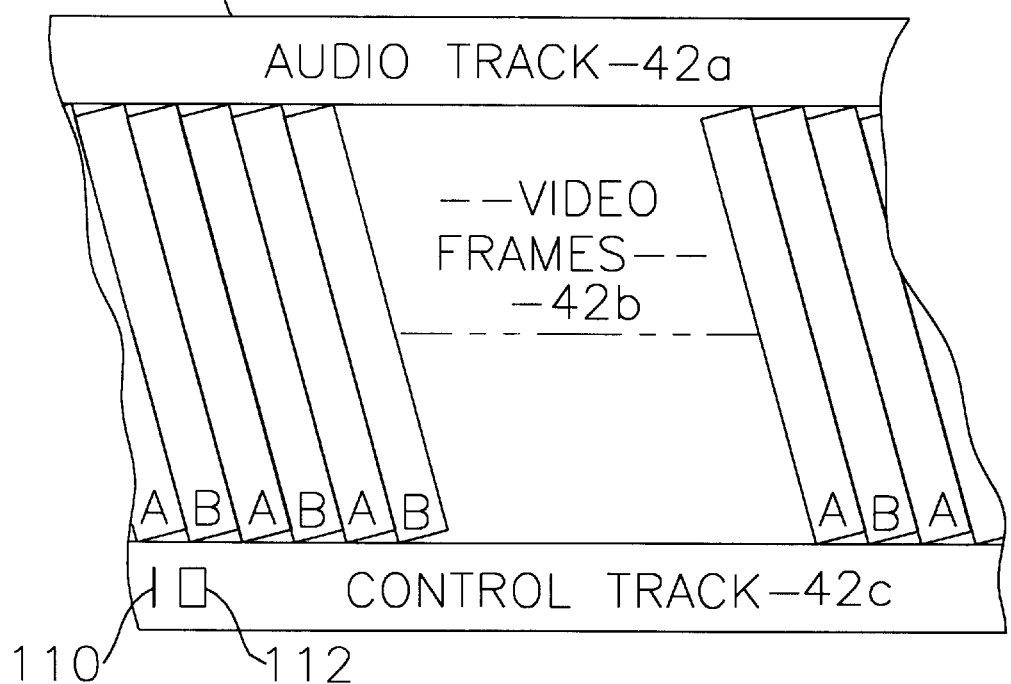
FIG. 4 is a graphical representation of the format of the information recorded on the magnetic tape in the cassette of FIG. 1 with markers and directories in the control track.
Figure 5:
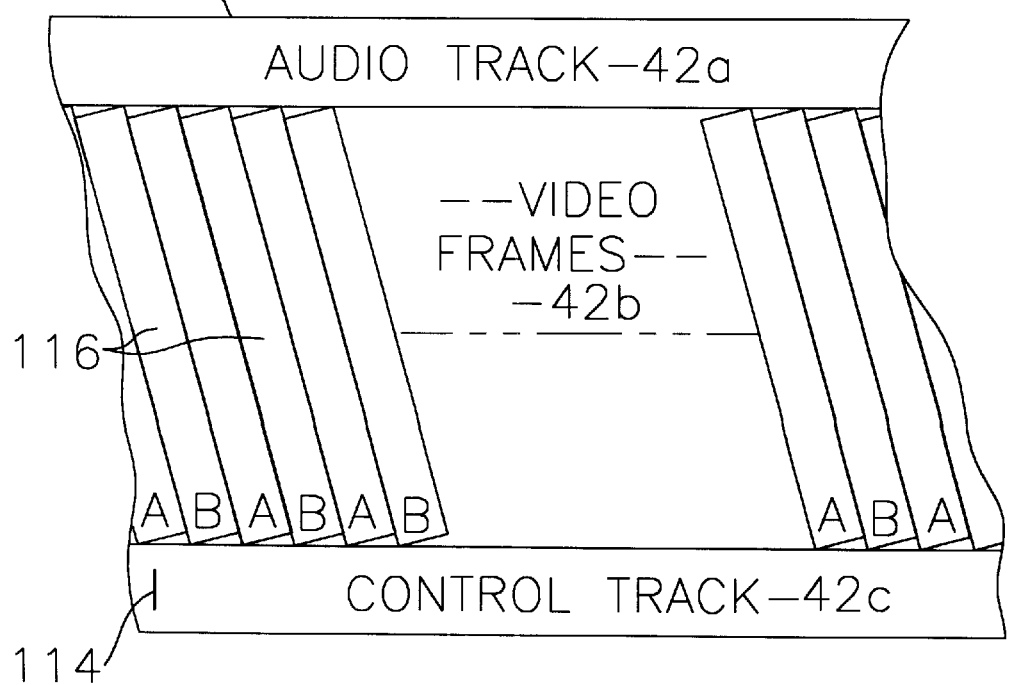
FIG. 5 is a graphical representation of the format of the information recorded on the magnetic tape in the cassette of FIG. 1 with markers in the control track and the directories in the fields of the video frames.

By way of background, the format of the tape 42 is now described. FIGS. 4 and 5 illustrate the information content of one example of video tape for both BETA and VHS format which both use the same general tape layout. The tape 42 is divided into three areas. A narrow strip running along the upper edge of the tape 42 is an audio track 42a which contains audio signals. A second narrow strip running along the bottom edge of the tape is a control track 42c which contains synchronization ("sync") control signals. The middle area 42b is for video signals which are recorded in pairs of parallel fields going up and down the width of the tape at a slight angle. Markers 110, 112, and 114 may be used.

The video head drum 13 is fitted with two read/record heads 180 degrees apart, so that even numbered lines make up one field and odd numbered lines make up the other field. To reduce flicker on the video screen, these fields are projected onto the face of the cathode ray tube (CRT) screen 50a of the video display 50 at alternating intervals.

Decoding VBI Information

Figure 6:
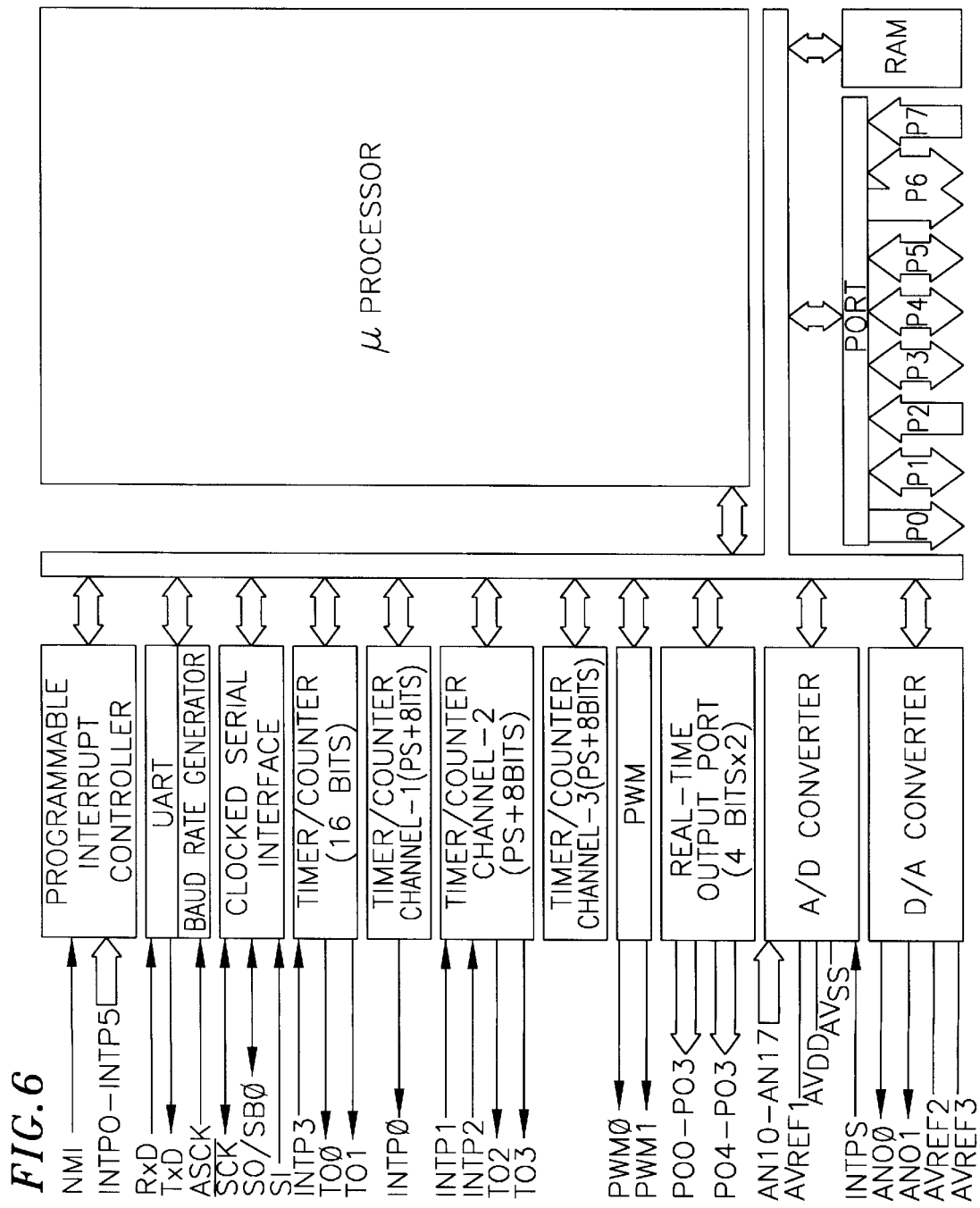
FIG. 6 is a block diagram illustrating the microprocessor controller of FIG. 1 and its interfaces for implementing a specific embodiment of the present invention.

Referring back to FIG. 1, the microprocessor controller 31 controls the sequence and operation of the directory controller 30 and interfaces with the VCR control logic circuit 21 to implement the necessary functional capabilities for reading, updating and recording the directory. The microprocessor controller 31, according to a specific embodiment, is a microcomputer chip with part number of UPD78234 from NEC Corporation, a logical block diagram of which is illustrated in FIG. 6. This microcomputer chip preferably is a microprogrammed processor capable of accessing a data memory of up to one megabyte. A plurality of input/output ports, P0–P7, are provided for coupling to various components of the VCR 1, such as the motor and mechanical control logic circuit 5, the video logic circuit 7, the position logic and counter circuit 9, and the control and audio track head logic circuit 11. Asynchronous communication between the microcomputer chip and these components is achieved by the provision of a plurality of interrupt inputs INPT0–INPT5.

Figure 7:
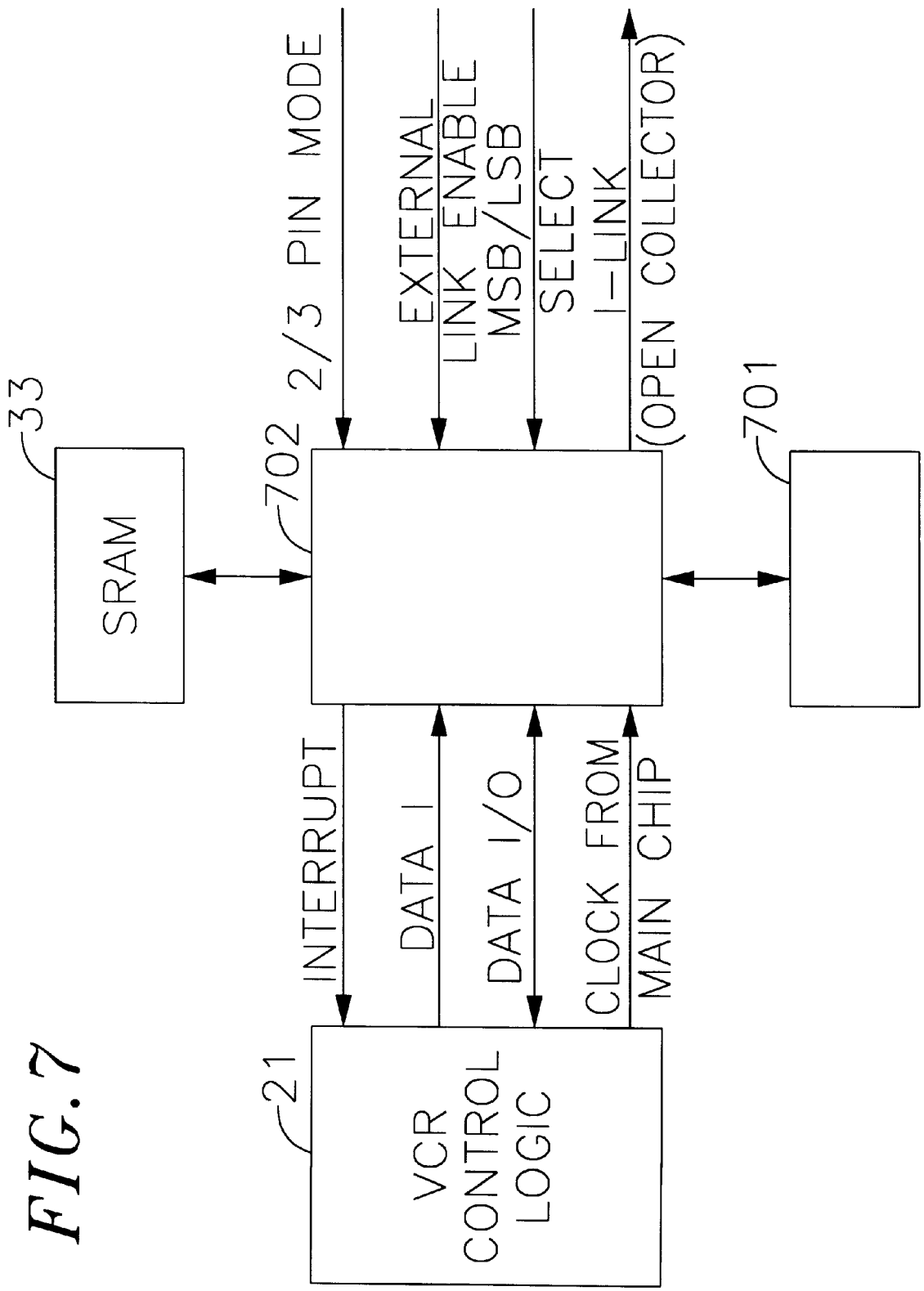
FIG. 7 is a block diagram illustrating the microprocessor controller of FIG. 1 and its interfaces for implementing another specific implementation of the microprocessor controller.

FIG. 7 shows a block diagram of another specific implementation of the microprocessor controller 31. A VBI signal processor 701 performs the vertical and horizontal synchronization separation of the VBI lines. The VBI signal processor 701 also slices and encodes the VBI lines. This controller performs the functions of the VBI encoder 60b, and the buffer 62 (see FIG. 5). A controller 702 controls the RAM 33 and performs error correction and decryption for some type of data coming from the VBI signal processor 701. The controller 702 also provides an interface with the serial link (I-LINK) and an interface with the VCR control logic circuit 21. The controller 702 also controls the RAM 33. The microcontroller processor 31 in the indexing VCR 10 performs all indexing functions and human interface, interprets (e.g. tab, indent, screen format, attributes) and processes the auxiliary information display. The microcontroller also performs all normal indexing VCR 10 functions.

In this embodiment, the interface between the controller 702 and the VCR control logic circuit 21 is a clock serial bus via two or three I/O lines which is hardware selectable by the two/three pin mode input signal to the controller 702. The interrupt signal line allows the VCR control logic circuit 21 to monitor the status of the controller 702 by interrupt. In a two pin configuration, the data I/O signal line functions as a two way signal path between the VCR control logic circuit 21 and the controller 702. In the three pin configuration, the controller 702 provides data on a data output signal line. Also, in the three pin configuration, the VCR control logic circuit 21 sends data on the data "I" line to the controller 702. The external length enable signal enables the controller 702 to communicate with the external RAM 73. The MSB/LSB select signal sets the serial bus to MSB first.

Indexing Overview

The VCR uses the directory described above in FIGS. 2 and 3 to perform searches of the user's tape library to find the tape that a selected program is on. The directory of a particular tape may be searched using keywords, or title information to locate a program on the tape. The tape may then be advanced to the selected program. Indexing is used herein to describe these searches, the generation of these directories, and all related functions.

The indexing VCR 10 provides a hybrid method for indexing recorded programs, which are recorded on one of three types of tape: home recorded tapes, prerecorded tapes, and retroactively indexed tapes. A home recorded tape (HR tape) is a tape on which the user has made recordings from broadcast or cable by either real time recording, timer programming his VCR, or using a VCR PLUS+™ programming system. The index is created at the time of recording by the VCR. The second type of tape is a prerecorded tape (PR tape) that is a commercially purchased tape, such as a Raquel Welch work-out tape, a karaoke tape, songs, lectures or speeches, that contains many titles on it or may contain only one program. These tapes are not expected to be overwritten. The index is stored on the tape by the video publisher at the time of the recording. The third type of tape is a retroactively indexed tape (RI tape) which is a previously unindexed recorded tape on which the user retroactively adds an index. For this type of tape, the index is added by the VCR at the time of the retroactively indexing. For the HR tapes and the RI tapes which are both produced by the home VCR, the directories all reside in the RAM 33 of the indexing VCR 10.

The TID's reference the tape to a corresponding directory stored in the RAM 33. When either a HR tape or a RI tape is inserted into the VCR, the VCR locates and reads the tape identification and then retrieves the corresponding directory from the RAM 33. This operation is preferably independent of the point of tape insertion to thereby effectively create a random access capability for selections on the tape. On the other hand, for PR tapes which are produced by the video publisher, the directory is stored on the tape preferably by writing it repeatedly on a VBI line. When the PR tape is inserted into an indexing VCR, the indexing VCR 10 independently of the point of tape insertion can quickly locate and read a copy of the directory from the VBI line. Thus, the PR tape can be read by random access also.

The VCR 1 includes a VBI encoder 60b coupled to the video logic circuit 7 whereby information, which receives digital data, such as tape label (e.g. a volume number), directory, and/or addresses, from the microprocessor controller 31 and encodes such data for recording into the VBI portion of the video signals which are to be recorded on the cassette tape 40. When line 21 field 2 is encountered, the digital data stored in the registers are output so that they can be written on the video track as described above.

VBI encoder 60b can be implemented in a similar manner as one of those already existing in the art, e.g. encoders for encoding closed-caption data into the VBI portions of video signals. An exemplary implementation of the VBI encoder 60b is illustrated in FIGS. 12a and 12b of application Ser. No. 08/176,852.

As illustrated in FIG. 9c, the VBI decoder 60a can be used at different time durations to decode either the broadcast signals (Video In) from the tuner 61 or the recorded signals (PB Signal) read by the video logic circuit 7 from the tape 42. When the VCR 1 is recording a program, the VBI decoder 60a operates to decode information in the VBI of the broadcast signals. When the VCR 1 is playing back a program from the cassette tape 40, the VBI decoder 60a can operate to decode information stored in the VBI of the recorded signals (e.g. previously recorded directory information).

Figure 11:
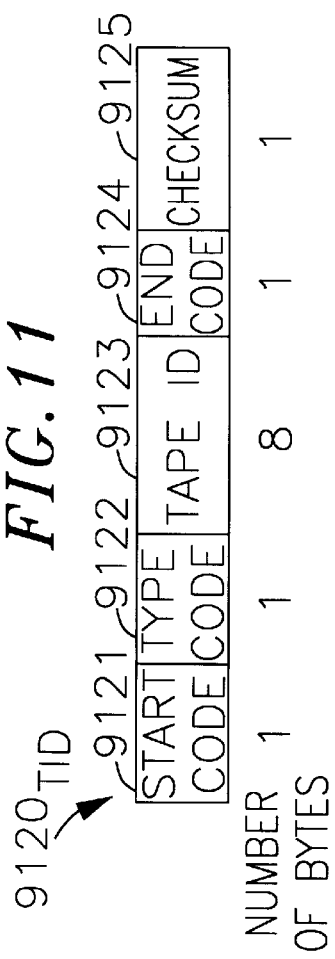
FIG. 11 is a schematic view showing the data packet format for the tape identification number (TID).

It needs to be noted that although the decoder 60a in the embodiment is used both for decoding broadcast signals and recorded signals, it will be understood that a separate decoder can be provided for each operation. Moreover, although the decoder 60a and the encoder 60b are shown and described as two units, they can be incorporated into a single semiconductor chip or implemented by discrete logic components. In the implementation of FIG. 11, the VBI signal processor 701 performs the VBI signal processing.

Prerecorded Tape

As described above, prerecorded tapes (PR tape) are manufactured by a tape publisher and contain a plurality of different titled programs thereon. A program directory or directories containing information about the names and locations of each program or record on the tape is stored on the tape. Also, a selected video frame for each recorded program is stored on the tape preferably at the beginning of the tape in the video track. In one of the specific embodiments, the label (e.g. a volume number or a name) for the tape is also recorded.

Either the video frames 42b or the control track 42c (see FIGS. 8–9) may be used for storing the program directory (s). In one embodiment, the program directory is stored, by the VCR control logic circuit 21 under control of the microprocessor controller 31, in the control track 42c and in another embodiment in odd and/or even numbered fields of spaced apart pairs of video fields, either as full video frame or in the VBI.

Directory

For HR tapes, the directories are stored in the RAM 33 and referenced by the TIDs which are written repeatedly on line 19 of the VBI for HR tapes. PR tapes also have a TID written on the VBI throughout the tape.

When a PR tape is inserted into an indexing VCR 10, the indexing VCR 10 reads the VBI line 19 to quickly determine the TID and program number (and, in some embodiments, an absolute address) and then stops. When the user presses the Index button, the indexing VCR 10 determines from the TID that the tape is not a HR tape. The indexing VCR 10 then goes into PLAY mode and reads the directory from VBI line 20 and displays it on-screen.

Addressing System

FIG. 9 is a schematic view of an embodiment for storing tape identification numbers and addresses using a file mark plus asynchronous sprinkling address system. In the preferred embodiment, the address system is a file mark plus asynchronous sprinkling (FMAS) address system. This system writes an absolute address on the control track 42c (see FIGS. 8–9) in the form of address packets. Since control track data is not readily copied from one VCR to another, some copy protection is provided. These packets are written in two types of locations. The first type (type 1) is written at the beginning of each program and at the end of the last program on the tape. The main function of these packets is to serve as "file marks" for search of starting points of programs. The second type of packet (type 2) is asynchronously recorded as often as possible in between the type 1 packets. The main function of these packets is to serve as "road marks" so that on insertion of the cassette 40 into the VCR 1, the current tape location can be quickly determined.

As an overview, when an indexed tape is inserted into the VCR 1, the VCR quickly determines from surrounding type 2 address packets the exact current tape location. To search for the starting point of some other program, the VCR 1 either fast forwards or rewinds and monitors the control track of the correct destination address packet. Once this packet is located, the VCR 1 stops and goes back at play speed to land exactly at the destination address packet. With the FMAS system, the determination of the current location is faster because of the asynchronous sprinkling of addresses. The search for the starting point of a program is accomplished since the VCR 1 monitors the control track 42c while fast forwarding or rewinding and is also accurate since the destination address packet is written exactly at the start of the program like a file mark.

In the FMAS address system, the absolute address is written on the control track 42c of the tape 42 in the form of address packets using the data encoding and decoding described above in connection with FIGS. 13a–13i. The absolute address is a measure of the distance from the beginning of the tape. This distance is preferably determined by counting control track pulses. For example, an address at a point of the tape may be the number of seconds in the SLP mode from the beginning of the tape to that point. Thus, an E-120 tape has an address range from 0 to 21600 (120 minutes×60 seconds). An address of 1140, for example, defines a point whose distance from the beginning of the tape can be covered in 1,140 seconds in SLP mode. If the VCR mode is recording or replaying in SP mode from the beginning, then after 380 seconds (1140 seconds÷3), the address is also 1140. If there is a blank space in between two programs, the address system takes that into account. For example, if program 1 is recorded in SLP mode and has an address of 1,000 at the end of the program, the tape then travels some distance before it starts program 2. Since there is no video signal between the end of program 1 and the beginning of program 2, there are no control track pulses to keep track of the distance travelled. In this case, the takeup spools spindle revolution counts can be used to interpolate. For example, the takeup spool spindle may be counting 1 count for 30 control track pulses, i.e. 1 address count at the end of program 1. At the beginning of program 2, the takeup spool may be counted in two counts for 30 control track pulses, i.e. 1 address count at the beginning of program 2. Thus, on the average, the takeup spool counts 1.5 counts per 30 control track pulses, i.e. 1 address count for the blank space between program 1 and program 2. If the takeup spindle counts 150 counts of blank space, it is assumed the control track would have counted 3,000 control track pulses (150÷1.5×30), i.e. 100 address counts. The starting address of program 2 is 1,000 (end of address of program 1)+100 (length of blank area)=1,100. The absolute address is written once at the beginning of each program and at the end of the last program. For HR tapes and PR tapes, the address is repeated as often as possible (in the order of once every few seconds) between the beginning and the end of every program. For RI tapes, the address is repeated as often as possible for some programs as will be described in detail below.

Other address systems may be used, as described in application Ser. No. 08/176,852.

To search for the starting point of some other program, the process for HR tapes and PR tapes are as follows. The VCR knows the current absolute address as well as the destination absolute address. While monitoring the take-up spool spindle revolution count, the machine quickly fast-forwards or rewinds to the vicinity, typically within 5 seconds of the destination, and then slows down to play speed to read the VBI and stop at the correct address. For RI tapes, the first part of the search process is identical to that of HR and PR tapes. Knowing the current absolute address and the destination absolute address and while monitoring the take-up spool spindle revolution count, the machine can quickly fast-forward or rewind to the vicinity of the destination. It then slows down to play speed to read the control track and stop at the correct address mark.

To perform a search, for HR and PR tapes, when the tape is inserted into the indexing VCR, the current location of the tape is known from the absolute address on the VBI line. From this address and from the directory recovered from the RAM 33 for HR tapes or from the VBI for PR tapes corresponding to the TID, the current program number is known. For example, if the current program is program 3 and the command is to go to program 6, the VCR must fast forward to land on the third indexing mark, such as a VISS or VASS mark, from the present location. Since the VCR can read the control track during fast forward or rewind, it can read marks stored in the control track. When the third mark is seen during the fast forward, the VCR switches to stop and then rewind since the third mark has been passed. The VCR then switches to play to read the absolute address and can then "soft-land" on the selected address. For RI tapes, once the program number is found, the process is the same.

As an overview, when an HR or PR tape is inserted into the indexing VCR 10, the indexing VCR 10 scans the VBI for a predetermined time, e.g., two seconds, and quickly determines from surrounding TP data packets the TID of the tape and the current program number. When the user presses the Index button, the indexing VCR 10 retrieves the directory from the RAM 33 and displays it along with the still video frame picture for the program identified by a cursor or some other means. When the user requests the indexing VCR 10 to move to the starting point of another program, the indexing VCR 10 executes a search by either fast forwarding or rewinding the tape while counting the number of VISS marks in the control track to the destination location.

In summary, Table I shows the directory and address systems for the 2 types of tapes.

TABLE I

| Tape Type | Directory | Address System |
|---|---|---|
| HR | RAM 33 in indexing VCR 10 | VISS + TP |
| PR | VBI on tape | VISS + TP |

Data Formats

For the data packets described below in conjunction with FIGS. 10–14, a byte refers to a seven bit data symbol plus an eighth bit which is reserved for a parity bit.

Figure 10:
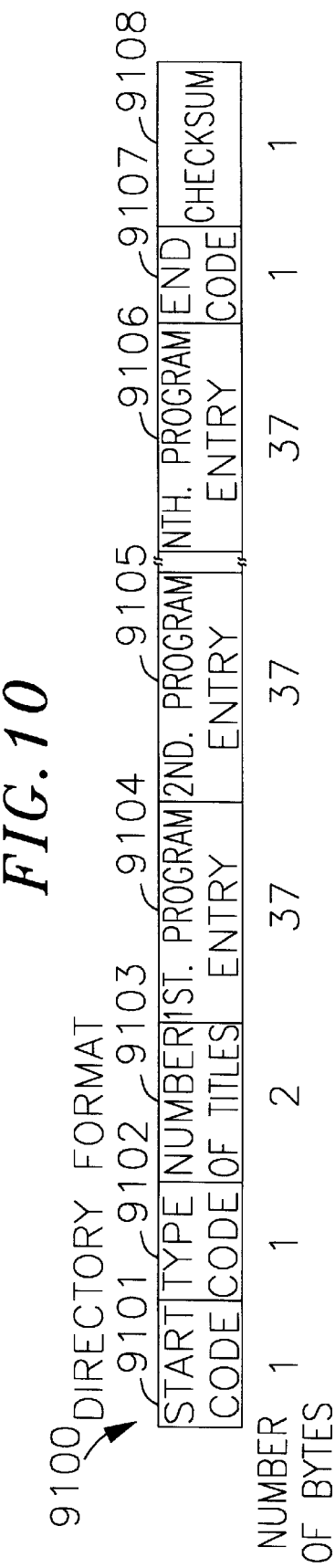
FIG. 10 is a schematic view showing the data format for the directory recorded on pre-recorded tapes.

FIG. 10 is a schematic view showing the data format for the directory recorded on pre-recorded tapes. A data packet 9100 begins with a start code 9101 having a length of one byte. The start code 9101 preferably has a value of 01 hex. A type code 9102 follows the start code 9101. The type code has a length of one byte. The type code 9102 preferably has a value 0X01. The next two bytes are a number of titles symbol 9103. The number of titles symbol 9103 represents the binary number coded in seven bit ASCII for the number of titles in the directory. In the preferred embodiment, only ASCII symbols '0'–'9' and 'A'–'Z' are used. For example the ASCII string '1F' represents the number 1FX. Since two ASCII characters are used, the largest number of titles is FF hex (256). Following the number of titles symbol 9103, a first program entry 9104, a second program entry 9105, and an Nth program 9106 contain the information related to N programs (FIG. 24 shows only the first, second and Nth program entries for-simplicity and clarity). Each program entry is a fixed length and contains a group of 37 byte long symbols. The first four bytes represent the binary address coded in seven bit ASCII, in a manner similar to that described above, for the number of titles symbol 9103. For example, the ASCII characters string "3F1A" represents the address of 3F1A hex. Since four ASCII characters are used, the largest number is FFFF hex (65535). The fifth byte of the program entry represents the recording mode. A value 0X00 is the Standard Play (SP) mode, a value 0X01 is the Long Play (LP) mode, a value 0X10 is the Super Long Play (SLP) mode, and the values 0X11–0X7F are used for the address of the still video frame picture for that program. The remaining 32 bytes of the program entry represent the program title code. The program title code is preferably coded in seven bit ASCII. An end code 9107 having a 1 byte long symbol follows the Nth program entry 9106. The end code 9107 preferably has a value 03 hex. The data packet 9100 ends with a checksum 9108 that is one byte long symbol. The checksum 9108 makes the modulo 128 sum of the whole data packet equal to zero, i.e., modulo 128 (start code 9101+type code 9102+number of titles 9103+program entries 9104, 9105, 9106+end code 9107+checksum 9108) equals zero. For prerecorded tapes, the directory is repeated as often as space allows in the VBI. Typically this means once every few seconds.

FIG. 11 is a schematic view showing the data packet format for the tape identification number (TID). For PR tapes, the tape I.D. is written repeatedly on one line of the VBI. For HR and RI tapes, the TID is written on the control track after the address mark at the beginning of each program and at the end of the last program. For HR tapes, the TID is also repeated as often as possible on the tape preferably once every few seconds.

The TID is a 48 bit number for HR and RI tapes. This number is composed of a header, a random machine identification number, and a tape number. Consequently, the danger of tapes having the same identification will be minimized. For PR tapes, the TID corresponds to the UPC code of the tape (a 12 digit number). This way city libraries, tape rental or retail stores can all adopt the TID of the indexing system.

A TID data packet 9120 is twelve bytes long. For the TID data packet, a byte refers to a seven bit data symbol plus an eighth bit which is reserved for a parity bit. The data packet 9120 begins with a start code 9121 having a length of one byte. The start code 9121 preferably has a value 01 hex. Following the start code 9121, a type code 9122 having a one byte long symbol and preferably has a value 0X04. A tape I.D. 9123 follows the type code 9122 and is eight bytes long. As noted above, the tape I.D. 9123 is determined differently for the type of tape. For a PR tape, the tape I.D. 9123 is a twelve digit UPC code which is a 48 bit number with most significant bit (MSB) of less than 0F0 hex. For HR tapes, the tape identification 9123 is composed of three parts. The first part is an eight bit header in the MSB which is equal to 0FF hex. The next 24 bits are an identification generated by a random number sequence to generate a high probability of uniqueness for each VCR. The 24 bit machine I.D. is created as a random number which is seeded by some condition that will most likely be different between users. In a first implementation the 24 bits is broken into two twelve bit numbers. At the first power up of the VCR, the counter is initialized with counting pulses of less than 0.25 milliseconds duration. The counter is stopped by the user's first and second key pressing on the remote controller. These two twelve bit random numbers are then combined to form the machine identification. Because the counter is very fast and the key pressed by the user is very random, the machine identification should be sufficiently random so that two VCR's will have a chance of approximately one out of sixteen million to have identical machine I.D.'s. A 16 bit tape number follows the machine I.D. which allows for 65536 tapes in one VCR. An end code 9124 follows the tape I.D. 9123 and is one byte long. The end code 9124 preferably has a value of 03 hex. A checksum 9125 follows the end code 9124 and is one byte long. The checksum 9125 makes the modulo 128 sum of the whole directory packet zero, i.e., modulo 128 of (start code 9121+type code 9122+tape I.D. 9123+end code 9124+checksum 9125) equals zero.

In an alternate embodiment, the machine identification portion of the 48 bits of the tape I.D. 9123 may be the Julien day, hour, and minute when the VCR is first put into use.

FIG. 12 is a schematic diagram showing the TID for an HR tape. The TID 2604 is a 5 byte number. Bit 39 and bits 38–31 are 0. Bits 30–16 are the machine ID. Bits 15–0 are the tape number. As described above, the 15 bit machine ID is a random number generated by the indexing VCR 10 at its first power up. This provides a 1 in 32,768 probability that two indexing VCRs have identical machine IDs. A 16 bit tape number allows each indexing VCR 10 to have 65,536 tapes stored in the RAM 33. Alternatively, the tape number may be composed of a different number of bits.

FIG. 13 is a schematic diagram showing the TID for a PR tape. As with the TID for an HR tape, the TID for a PR tape is a 5 byte number. Bit 39 is one, bits 38–0 are the eleven digit UPC number represented in binary form without the parity digit. By using the UPC number, businesses, such as libraries, tape rental stores, and retail outlets, can adopt the TID. Accordingly, usage of PR tapes can be monitored and analyzed. When the TID is stored into the RAM 33, 5 bytes is preferred. However, if only 4 bytes are recorded, bits 0–30 and bit 39 are stored in the RAM 33.

Figure 14:
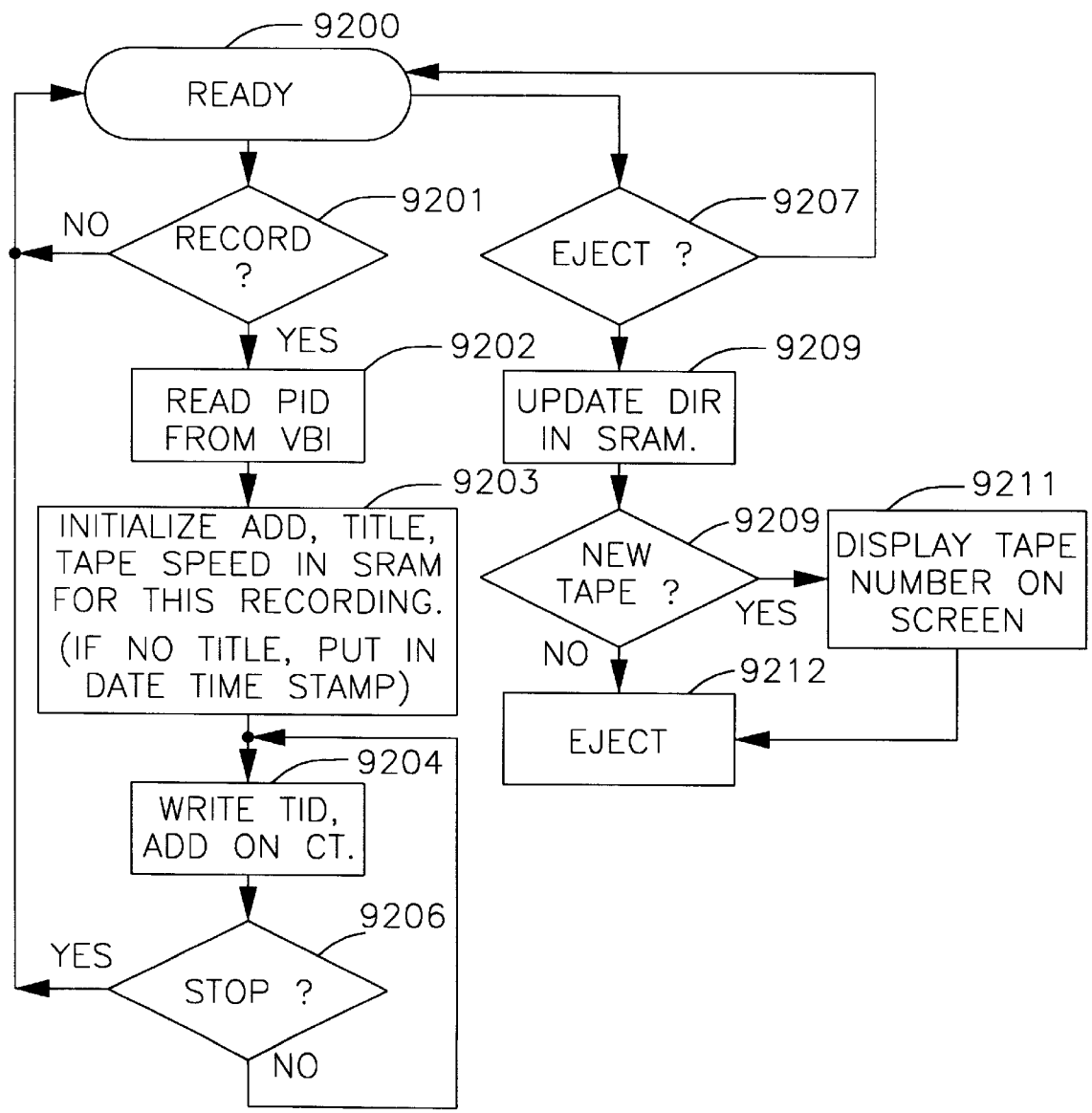
FIG. 14 is a flow chart showing the steps employed in the operation of an indexing VCR using a FMAS addressing system for writing a tape identification number, an address, and a directory to a home recorded tape (HR tape) during recording or ejection.

FIG. 14 is a flow chart showing the steps employed in the operation of an indexing VCR using a FMAS addressing system for writing a tape identification number, an address, and a directory to a home recorded tape (HR tape) during recording or ejection. When a tape is in the VCR and the directory controller 30 knows the present tape identification number and the current address, the VCR is ready for recording on the tape or ejecting the tape (step 9200). The microprocessor controller 31 reads the TID and the address from the control track 42c. For existing HR tapes, the TID and address are read from the control track 42c. For a new blank tape, the microprocessor controller 31 assigns a TID to the tape and resets the address to zero. The microprocessor controller 31 waits for either a record signal or an eject command. If a record signal is received (step 9201), the microprocessor controller 31 reads the program identification number from the VBI of the signal that is to be recorded (step 9202). It is assumed that the microprocessor controller 31 has already retrieved the directory for the inserted tape if the inserted tape is an existing HR tape. For a new blank tape, the microprocessor controller 31 creates a new directory in the RAM 33 with still video frame pictures stored as part of the directory. For this recording, the microprocessor controller 31 initializes the address, the title and the tape speed in the RAM 33 and the flag sensor in the VCR control logic 21. If no title is read from the VBI (step 9202), the microprocessor controller 31 uses a date time stamp as the title (step 9203). The microprocessor controller 31 then commands the VCR control logic circuit 21 and subsequently the control and audio track head logic circuit 11 to write the TID and the address on the control track 42c. (step 9204) The microprocessor controller 31 continues to write the date and address on the control track 42c until a command to stop recording is received. (step 9206) During the recording, the VCR control logic 21 receives the packet which informs the logic 21 of the location of the frame of video to be captured and stored as the still video frame picture for the program. At the completion of recording the program, the microprocessor control 31 then returns to a ready state where it awaits a further command at step 9200.

On the other hand, if a command to eject the tape is received (step 9207), the microprocessor controller 31 updates the directory that is stored in the RAM 33, including the current tape location (current LOC) flag 1049 (See FIG. 3) which indicates the absolute address of the location of the tape when the tape is ejected referenced to the beginning of the tape. If the tape is a new blank tape (step 9209), the microprocessor controller 31 displays on the video display 50a the tape number of the tape, so that the user can then mark the housing of the cassette 40 with this new number for subsequent identification. The VCR control logic circuit 21 then commands the motor and mechanical control circuit 5 to eject the tape (step 9212).

Operation of Identifying Tape and Recovering Directory

Figure 15:
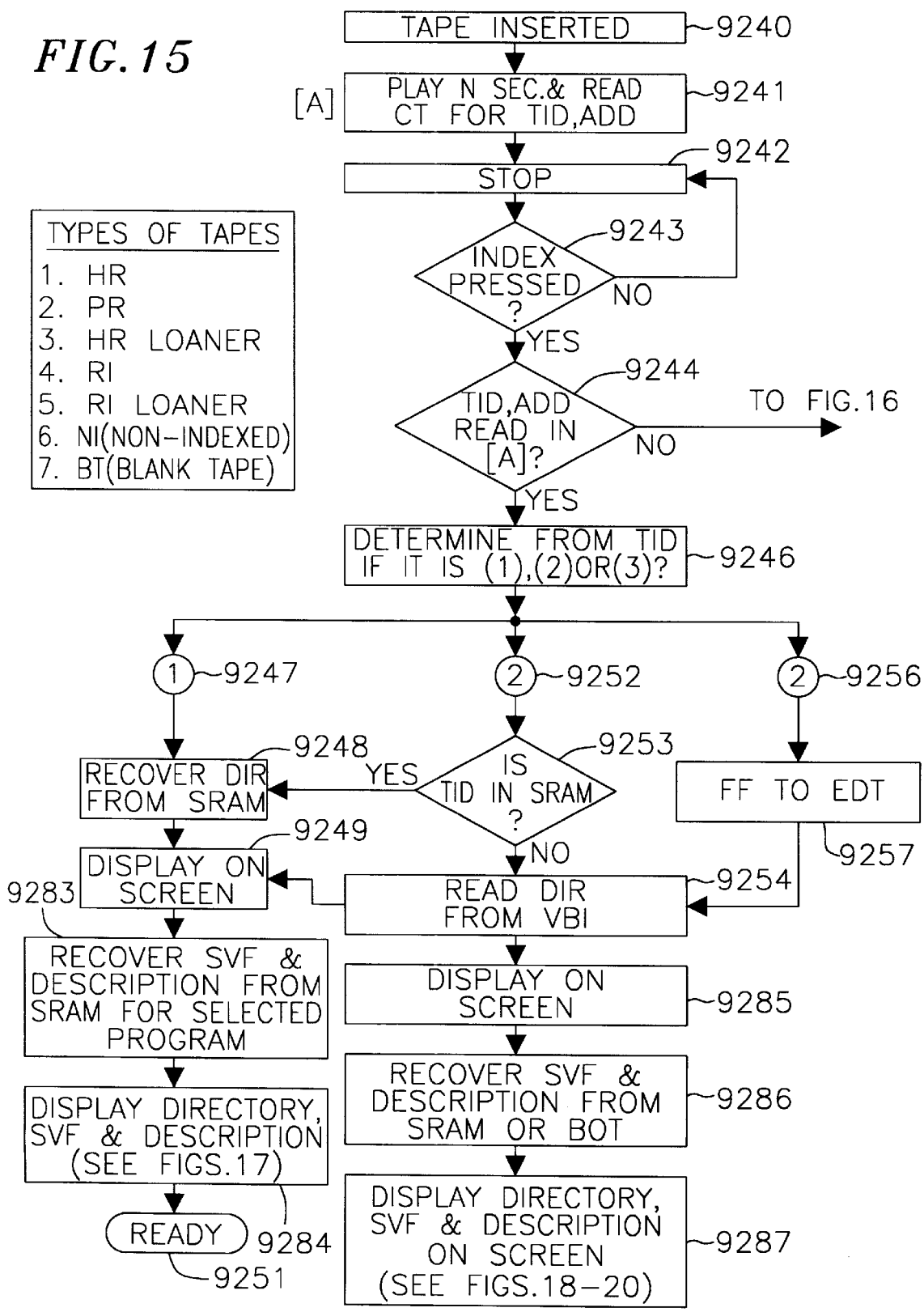
FIGS. 15 and 16 are flow charts showing the steps employed in the operation of the indexing VCR using a FMAS addressing system when a tape is inserted therein.
Figure 16:
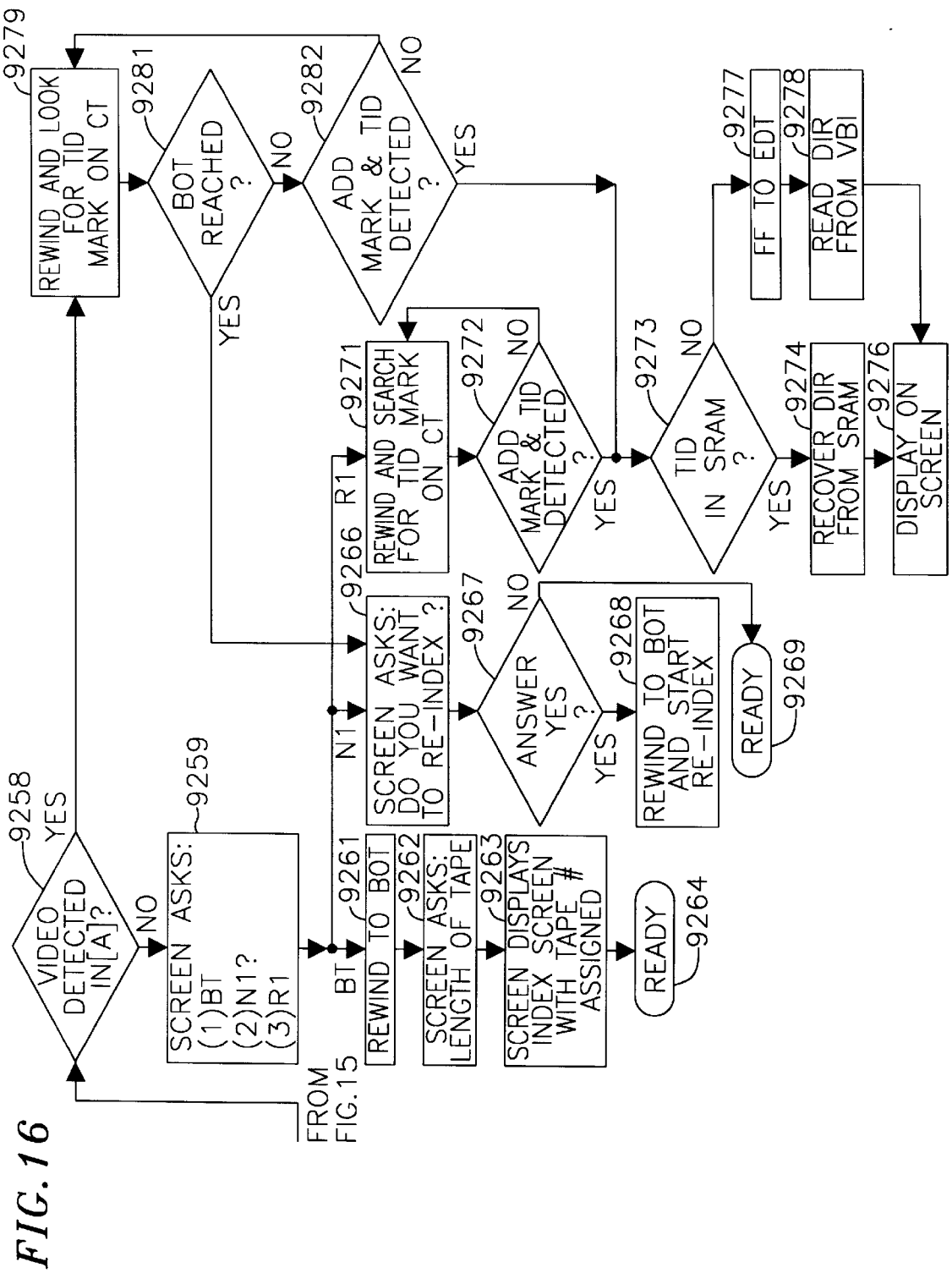

FIGS. 15 and 16 are flow charts showing the steps employed in the operation of the indexing VCR using a FMAS addressing system when a tape is inserted therein. When a tape is inserted into the VCR (step 9240), the microprocessor controller 31 commands the VCR control logic circuit 21 to play the tape for N seconds and read the control track for the TID and an address (step 9241: this step is referred to as step [A] in subsequent steps of FIGS. 15 and 16. N is preferably between 3 to 5 seconds. (When the tape was previously ejected, the indexing VCR may rewind the tape for a predetermined time interval, e.g. 5 seconds of play time, to make the retrieval of the TID quicker.) After reading a TID and an address from the tape, the microprocessor controller 31 commands the VCR control logic circuit 21 to stop the playing of the tape (step 9242). The microprocessor controller 31 waits until the INDEX button on the remote controller is pressed (step 9243). When the INDEX button is pressed, if a TID and an address were read at step 9241 (step 9244), the microprocessor controller 31 determines from the TID whether the tape is (1) a home recorded tape (HR), (2) a prerecorded tape (PR), or (3) a home recorded (HR) loaner (step 9246).

Figure 17:
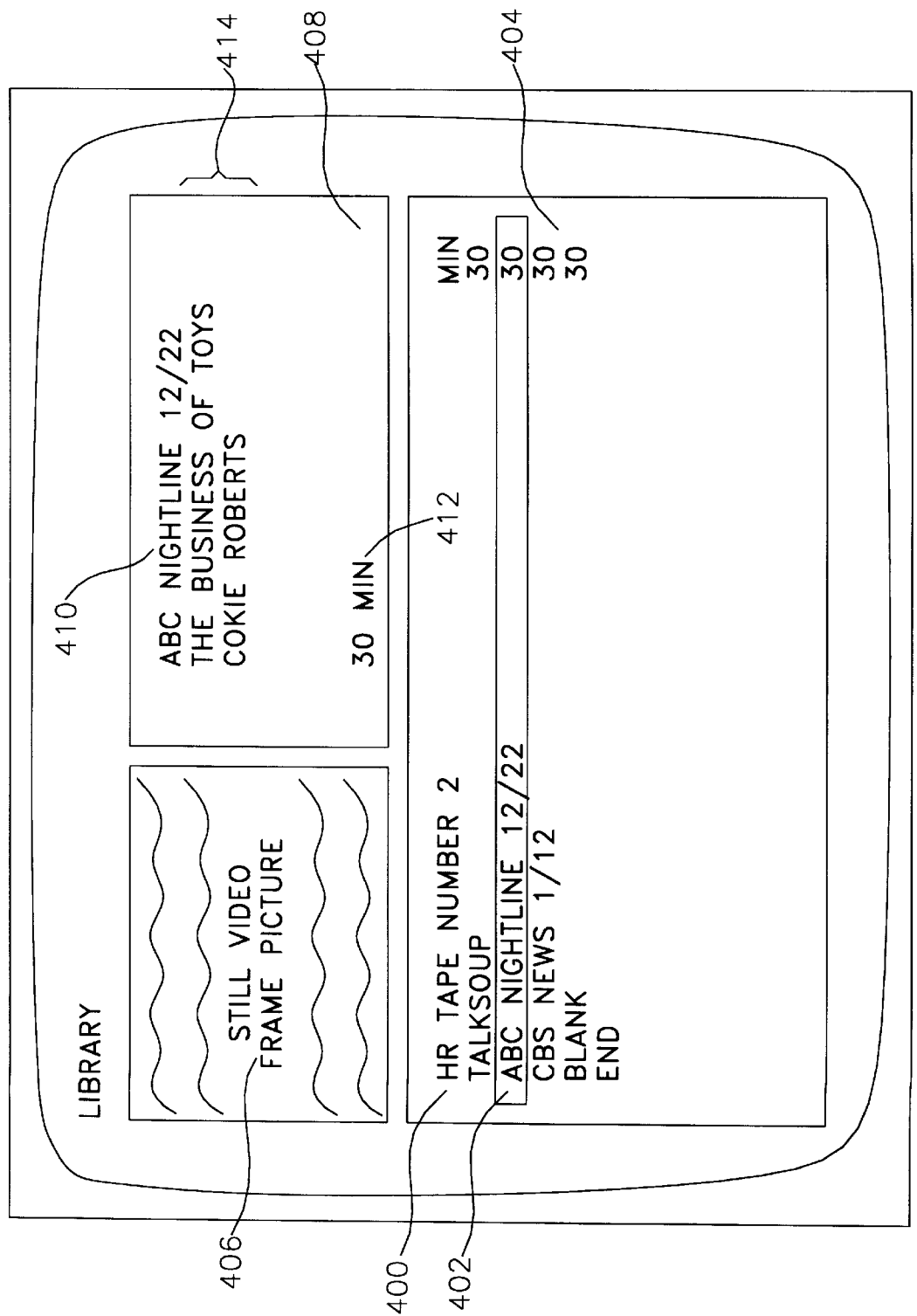
FIG. 17 is a display of the directory and SVF picture and description for an HR tape.

If at step 9246 the tape is a HR tape (step 9247), the microprocessor controller 31 recovers the directory 33a corresponding to the tape with that TID from the RAM 33 (step 9248). The microprocessor controller 31 then displays the recovered directory on the video display 50a (step 9249). The user moves the cursor or otherwise selects the program of interest. The microprocessor controller 31 then recovers the still video frame (SVF) picture for this program and the description (step 9283). The SVF picture and description are displayed with the directory (step 9284) as shown in FIG. 17. The microprocessor controller 31 then enters a ready mode (step 9251). The ready mode is a mode in which the microprocessor controller 31 knows the current address of the selected program and the TID of the tape.

If at step 9246 it is determined that the tape is a prerecorded tape (step 9252), the microprocessor controller 31 reads the directory, including the SVF picture and description, to determine if the TID is stored in the RAM 33 (step 9253). If it is in the RAM 33, the microprocessor controller 31 recovers the directory from RAM 33 as described above in step 9248. On the other hand, if the TID is not in the RAM 33, the microprocessor controller 31 commands the VCR control logic circuit 21 to play the tape so that the microprocessor controller 31 can read the directory from the VBI on the tape (step 9254) and then displays the read directory on the screen at step 9285.

The program in the directory selected by the user, such as by a cursor, is noted and the SVF picture and description for this program are recovered from the beginning of the tape (BOT) or from SRAM (step 9286). The SVF picture and description are displayed with the directory (step 9287) as shown in FIGS. 18–20.

Referring to FIG. 17, the display for a home recorded tape, in this example, HR tape number 2 (400), contains a listing of the titles and lengths of the programs recorded on the cassette. A cursor 402 highlights the second program listed, ABC Nightline 12/22 and the display thus additionally contains a still video frame picture 406 for this program and a description of the program 414.

The SVF picture and description are positioned in the upper part of the screen with the textual directory in the lower part of the screen. The upper part has a colored background, such as blue, for enhancing the display.

Figure 18:
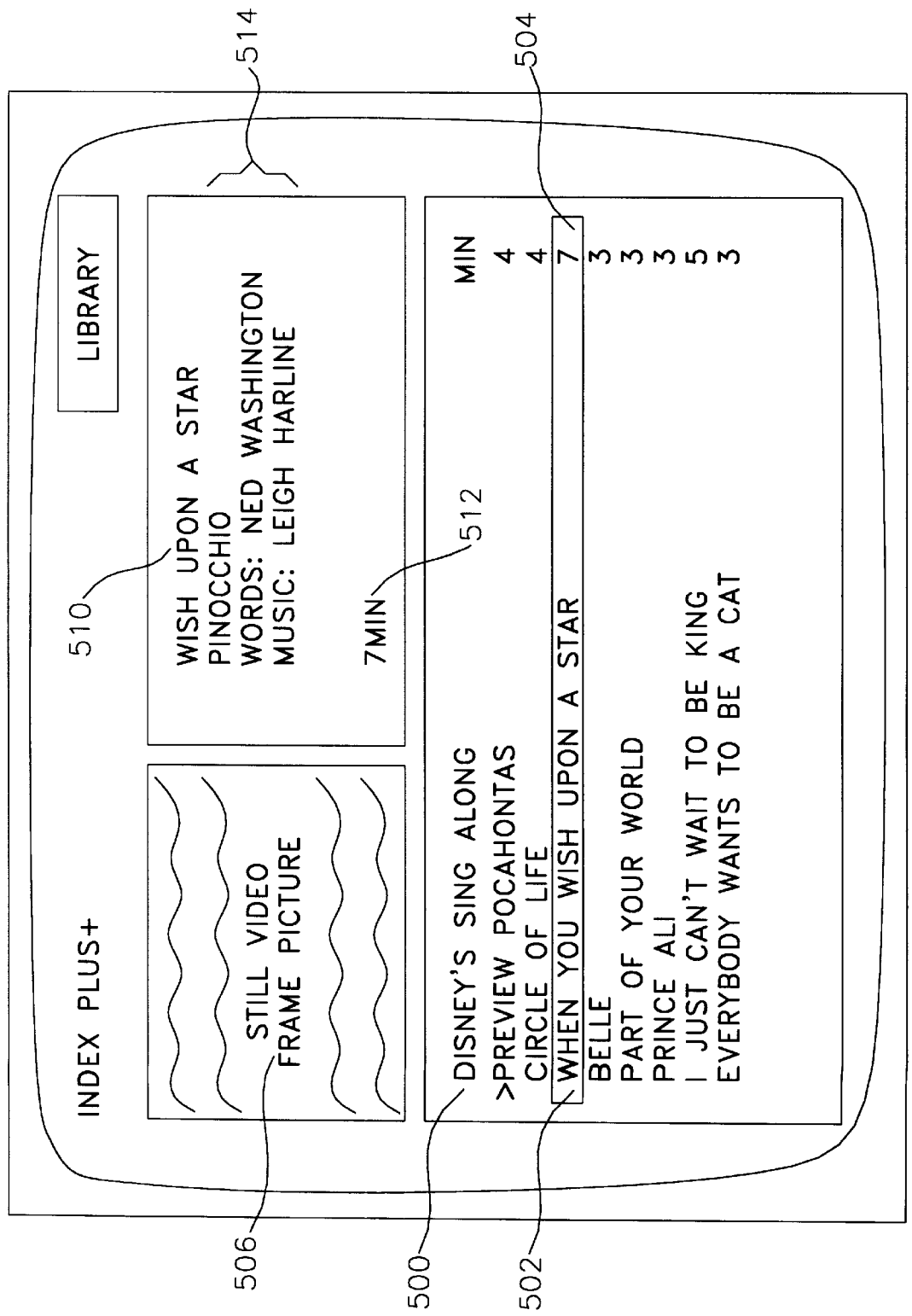
FIG. 18 is a display of the directory and SVF picture and description for a PR tape.
Figure 19:
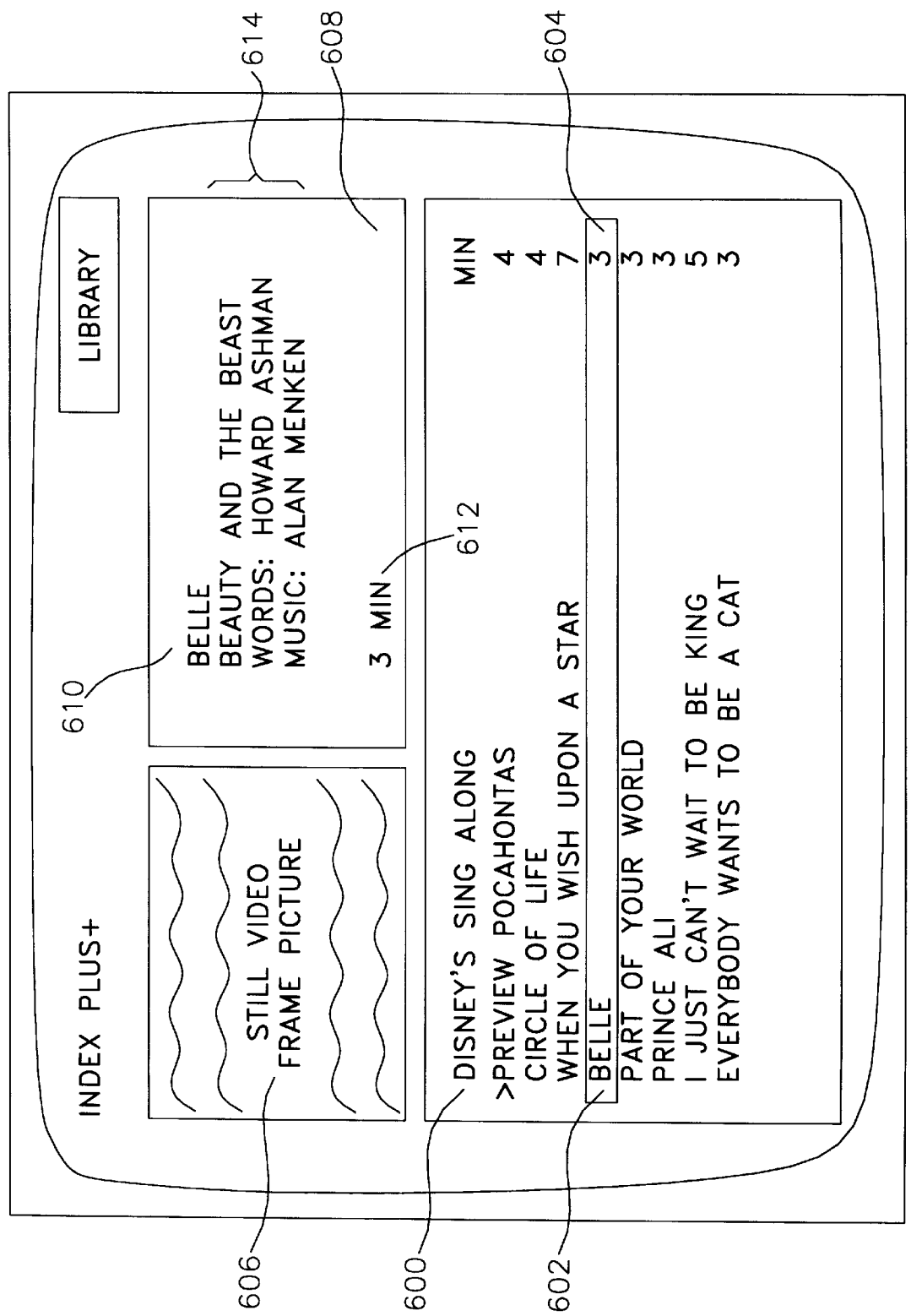
FIG. 19 is a display of the directory and SVF picture and description for the same PR tape with a different program selected.
Figure 20:
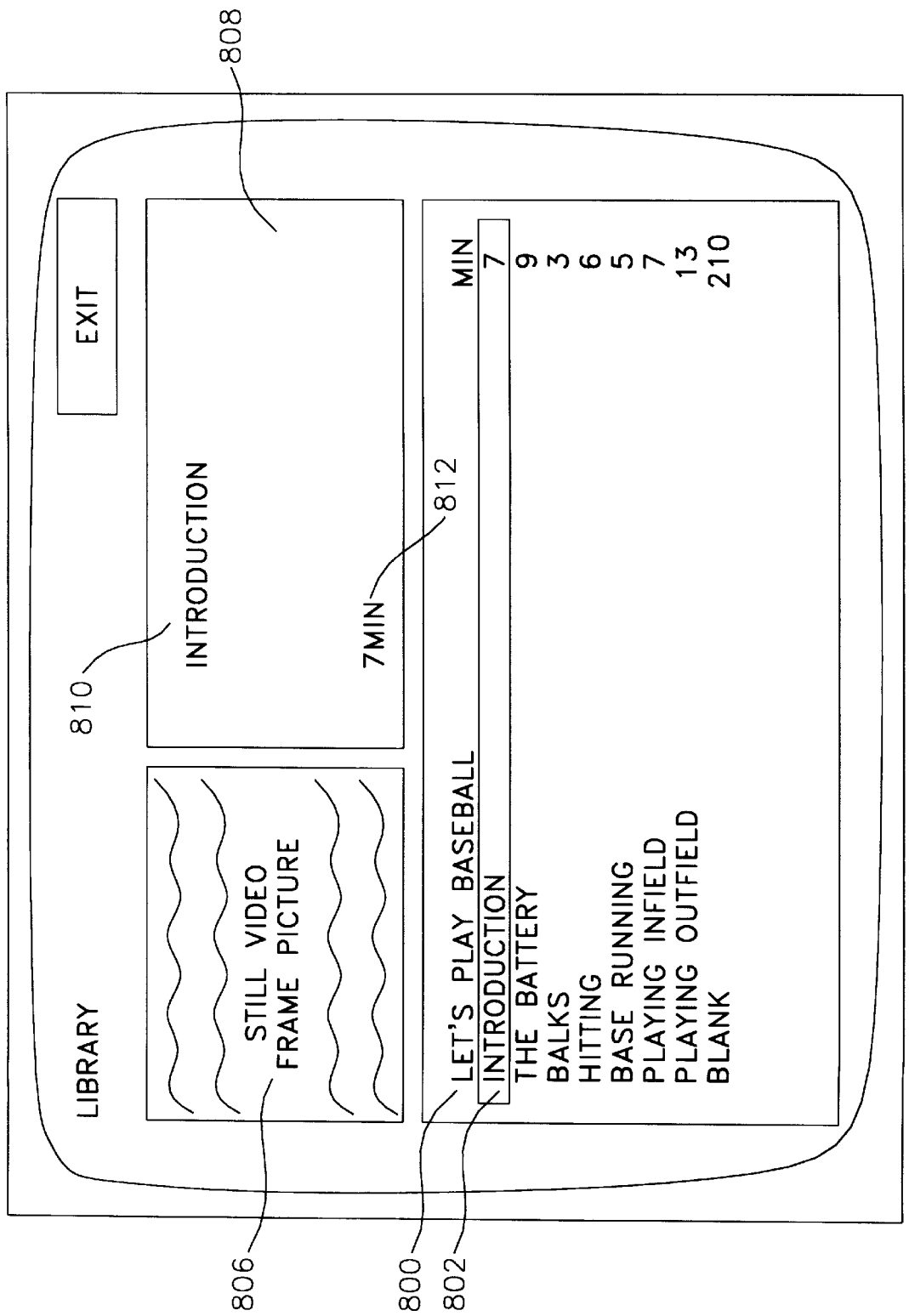
FIG. 20 s a display of the directory and SVF picture and description for another PR tape.

FIGS. 18 and 19 are displays for the programs recorded on the same PR tape. The cursor 502 in FIG. 18 is highlighting the title of a program, in this case, a song with words for singing along. The SVF picture 506 is displayed along with the description 514. The description sets forth the names of the composer and the performer as well as the particular story in which the song occurs.

In FIG. 19 a different song or program is highlighted so that a different SVF picture 606 appears on the screen.

FIG. 20 depicts the display for another PR tape entitled Let's Play Baseball. The introduction 802 is highlighted and the SVF picture 806 is related to the introduction.

Function codes for the control logic 21 are described in application Ser. No. 08/176,852. A function code issued by the VCR logic 21 controls the capture and storage of each selected from of video.

In the foregoing, certain values and representations are used to facilitate description and understanding of the invention. Moreover, values of electrical components are shown for circuits illustrated in some of the figures, it will be understood such values are shown to facilitate implementation of the invention and the functions of the circuits can be accomplished by other values or even other components. Therefore, the foregoing description should not be read as pertaining only to the precise structures and techniques described, but rather should be read consistent with, and as support for, the following claims, which are to have their fullest and fair scope.

What is claimed is:

1. A video tape player comprising:
   a receiver capable of receiving broadcast video signals of a video program having a title and a data packet carrying information identifying a selected video frame;
   a magnetic head for recording said broadcast video signals on to a cassette tape;
   a decoder coupled to said receiver and decoding signals contained in a predetermined interval of said broadcast video signals to produce information signals representing the title and the identity of the selected video frame;

a controller receiving information signals and using said information signals to operate said video tape player;

means for storing said title in a directory of video programs; and means for capturing and storing the selected video frame.

2. The video tape player of claim 1 wherein said predetermined interval of said broadcast video signals comprises a vertical blanking interval (VBI) of said broadcast video signals.

3. The video tape player in accordance with claim 1 wherein said title storing means comprises means for storing said title on a track of said tape.

4. The video tape player in accordance with claim 3 wherein said track is a control track.

5. The video tape player in accordance with claim 3 wherein said track is a video track.

6. The video tape player in accordance with claim 5 wherein said title is stored in portions of said video track which record vertical blanking intervals of video signals.

7. A video tape player in accordance with claim 1 further comprising a magnetic head for reading from a tape a still video frame for programs recorded on the tape.

8. The video tape player in accordance with claim 7 further comprising a magnetic head for reading from a tape a title for the program having a still video frame recorded on the tape.

9. A video tape player in accordance with claim 8 further comprising means for displaying the SVF picture and title.

10. The video tape player of claim 1 wherein said means for capturing the selected video frame comprises capturing the selected video frame from said broadcast video signals.

11. A method for storing, retrieving, a and displaying information on a video cassette tape comprising the steps of:

recording a plurality of video programs on the tape, each video program being made up of a series of still frame images;

recording on the tape a directory of the titles of the video programs and their beginning locations on the tape;

recording on the tape a still frame image of each video program;

retrieving the title, beginning location, and still frame image; and displaying the retrived still frame image and the retrived title at the same time for at least one of the video programs.

12. The method of claim 11, in which the step of recording the still frame image records the still frame image at the beginning of the tape before any programs.

13. The method of claim 11, additionally comprising the steps of receiving the video program on a television signal and marking the still frame image to be recorded in the television signal.

14. A method for storing, retrieving, and displaying information on a video cassette tape comprising the steps of:

recording a plurality of video programs on the tape, each video program being made up of a series of still frame images;

recording on the tape a directory of the titles of the video programs and their beginning locations on the tape;

recording on the tape a still frame image of each video program;

retrieving the title, beginning location, and still frame image; and displaying the retrieved still frame image and a still frame image description at the same time for at least one of the video programs.

* * * * *

UNITED STATES PATENT AND TRADEMARK OFFICE
CERTIFICATE OF CORRECTION

PATENT NO. : 6,240,241 B1
DATED : May 29, 2001
INVENTOR(S) : Henry C. Yeun

It is certified that error appears in the above-identified patent and that said Letters Patent is hereby corrected as shown below:

Column 16,
Line 65, replace "on to" with -- onto --.

Column 17,
Line 35, after "retrieving," delete "a."

Column 18,
Line 10, replace "retrived still frame image and the retrived" with -- retrieved still frame image and the retrieved --.

Signed and Sealed this

Seventeenth Day of September, 2002

Attest:

JAMES E. ROGAN
Attesting Officer
Director of the United States Patent and Trademark Office